United States Patent
Tebay

(10) Patent No.: US 10,051,178 B2
(45) Date of Patent: Aug. 14, 2018

(54) IMAGING METHOD AND APPARTUS

(71) Applicant: BAE SYSTEMS PLC, London (GB)

(72) Inventor: Andrew Christopher Tebay, Warton (GB)

(73) Assignee: BAE Systems plc, London (GB)

( * ) Notice: Subject to any disclaimer, the term of this patent is extended or adjusted under 35 U.S.C. 154(b) by 172 days.

(21) Appl. No.: 15/100,469

(22) PCT Filed: Dec. 4, 2014

(86) PCT No.: PCT/EP2014/076535
§ 371 (c)(1),
(2) Date: May 31, 2016

(87) PCT Pub. No.: WO2015/082595
PCT Pub. Date: Jun. 11, 2015

(65) Prior Publication Data
US 2016/0301859 A1    Oct. 13, 2016

(30) Foreign Application Priority Data

Dec. 6, 2013  (EP) .................................... 13275300
Dec. 6, 2013  (GB) .................................. 1321550.4

(51) Int. Cl.
*H04N 5/232*     (2006.01)
*G08G 5/00*      (2006.01)
(Continued)

(52) U.S. Cl.
CPC ....... *H04N 5/23222* (2013.01); *B64C 39/024* (2013.01); *G05D 1/0094* (2013.01);
(Continued)

(58) Field of Classification Search
None
See application file for complete search history.

(56) References Cited

U.S. PATENT DOCUMENTS 3,108,182 A    10/1963   Gray et al.
5,507,452 A    4/1996    Mayersak
(Continued)

FOREIGN PATENT DOCUMENTS

EP    1903297 A2      3/2008
EP    2071353 A2 *   6/2009    ........... G01S 3/7864
(Continued)

OTHER PUBLICATIONS

International Search Report and Written Opinion dated Jun. 7, 2016 of Application No. PCT/EP2014/076539 filed Dec. 4, 2014.
(Continued)

*Primary Examiner* — Reza Aghevli
(74) *Attorney, Agent, or Firm* — Maine Cernota & Rardin

(57) ABSTRACT

An imaging method for capturing images using a sensor mounted on an unmanned aircraft comprises: acquiring a range of motion of the sensor relative to the aircraft; acquiring a specification of a linear path along the ground; acquiring parameter values relating to aircraft maneuverability; using the acquired information determining a procedure; performing, by the aircraft, the procedure and simultaneously capturing, by the sensor, a set of images. The procedure comprises the aircraft moving with respect to the path and the sensor moving with respect to the aircraft such that at some time each point along the path is coincident with a footprint of the sensor. Also, each point along the path is present within at least one of the captured images.

14 Claims, 11 Drawing Sheets

(51) Int. Cl.
  *G06T 7/246* (2017.01)
  *G05D 1/00* (2006.01)
  *B64C 39/02* (2006.01)

(52) U.S. Cl.
  CPC ............ *G06T 7/246* (2017.01); *G08G 5/0069* (2013.01); *H04N 5/23296* (2013.01); *B64C 2201/123* (2013.01); *B64C 2201/141* (2013.01)

(56) References Cited

U.S. PATENT DOCUMENTS

| | | | |
|---|---|---|---|
| 5,657,947 | A | 8/1997 | Mayersak |
| 6,254,031 | B1 | 7/2001 | Mayersak |
| 7,418,320 | B1* | 8/2008 | Bodin ............... G05D 1/0094 701/26 |
| 7,787,659 | B2 | 8/2010 | Schultz |
| 8,260,734 | B2 | 9/2012 | Tranchero |
| 8,674,277 | B2 | 3/2014 | Axford |
| 8,687,062 | B1 | 4/2014 | Reece |
| 8,718,838 | B2* | 5/2014 | Kokkeby ............. G01S 3/7864 701/3 |
| 8,788,121 | B2* | 7/2014 | Klinger .............. G05D 1/104 701/3 |
| 8,874,360 | B2* | 10/2014 | Klinger .............. G08G 1/162 701/22 |
| 9,127,908 | B2 | 9/2015 | Miralles |
| 9,410,783 | B1 | 8/2016 | Khuc |
| 9,592,911 | B2* | 3/2017 | Liu ..................... B64C 39/024 |
| 9,604,723 | B2* | 3/2017 | Liu ..................... B64C 39/024 |
| 9,607,219 | B2 | 3/2017 | Greveson |
| 2005/0127242 | A1 | 6/2005 | Rivers, Jr. |
| 2006/0074557 | A1* | 4/2006 | Mulligan ............ G05D 1/0094 701/13 |
| 2007/0029439 | A1 | 2/2007 | Raytheon |
| 2009/0146010 | A1 | 6/2009 | Cohen |
| 2009/0157233 | A1* | 6/2009 | Kokkeby ............. G01S 3/7864 701/3 |
| 2009/0187299 | A1 | 7/2009 | Fregene |
| 2010/0004802 | A1 | 1/2010 | Bodin |
| 2010/0017046 | A1* | 1/2010 | Cheung .............. G01S 7/003 701/2 |
| 2010/0042269 | A1* | 2/2010 | Kokkeby ............. G01S 3/7864 701/3 |
| 2010/0157056 | A1 | 6/2010 | Zohar |
| 2010/0198514 | A1 | 8/2010 | Miralles |
| 2010/0244471 | A1 | 9/2010 | Wiedermann et al. |
| 2010/0245571 | A1 | 9/2010 | DeVoe |
| 2010/0282893 | A1 | 11/2010 | Roemerman |
| 2010/0320312 | A1 | 12/2010 | Bril |
| 2010/0326264 | A1 | 12/2010 | Roemerman |
| 2011/0084162 | A1 | 4/2011 | Goossen |
| 2013/0070239 | A1 | 3/2013 | Crawford |
| 2013/0238170 | A1* | 9/2013 | Klinger .............. G05D 1/104 701/3 |
| 2014/0081505 | A1* | 3/2014 | Klinger .............. G08G 1/162 701/25 |
| 2015/0066248 | A1 | 3/2015 | Arbeit |
| 2015/0226575 | A1 | 8/2015 | Rambo |
| 2015/0248584 | A1 | 9/2015 | Greveson |
| 2016/0301859 | A1 | 10/2016 | Tebay |

FOREIGN PATENT DOCUMENTS

| | | | | |
|---|---|---|---|---|
| EP | 2071353 | A2 | 6/2009 | |
| EP | 2244150 | A2 | 10/2010 | |
| GB | 1428948 | A | 3/1976 | |
| GB | 2468345 | A | 9/2010 | |
| WO | 2000073727 | A1 | 12/2000 | |
| WO | 2008065651 | A2 | 6/2008 | |
| WO | 2008075335 | A1 | 6/2008 | |
| WO | 2010134075 | A1 | 11/2010 | |
| WO | 2013134590 | A2 | 9/2013 | |
| WO | WO-2013134590 | A2 * | 9/2013 | ............ G08G 1/162 |
| WO | 2014145328 | A1 | 9/2014 | |
| WO | 2014169354 | A1 | 10/2014 | |

OTHER PUBLICATIONS

International Search Report and Written Opinion dated Jun. 7, 2016 of Application No. PCT/EP2014/076538 filed Dec. 4, 2014.
International Search Report and Written Opinion dated Jun. 7, 2016 of Application No. PCT/EP2014/076535 filed Dec. 4, 2014.
GB Search Report dated May 30, 2014 of Patent Application No. GB1321548.8 filed Dec. 6, 2013.
GB2 Search Report dated May 14, 2015 of Patent Application No. GB1421540.4.
EP Search Report dated May 27, 2014 of Patent Application EP13275298 filed Dec. 6, 2013.
Yu Zhang et al, "Pseudospectral Method for Autonomous Attack Trajectory Planning of a Fixed-wing UCAV", Intelligent Human-Machine Systems and Cybernetics (IHMSC), 2012 4th International Conference on, IEEE, Aug. 26, 2012, pp. 216-221, XP032240850.
Nan Wang et al, "Optimization of tactical aircraft weapon delivery using Tactics Templates", Informatics in Controlm Automation and Robotics (CAR), 2010 2nd International Asia Conference on, IEEE, Mar. 6, 2010, pp. 21-27, XP031663862.
PCT Search Report dated Feb. 11, 2015 of Patent No. PCT/EP2014/076539 filed Dec. 4, 2014.
PCT Search Report for PCT Application No. PCT/EP2014/076538 dated Jan. 30, 2015, 10 pages.
EP Search Report for EP Application No. 13275299.9 dated May 30, 2014, 9 pages.
GB Search Report for GB Application No. 1321549.6 dated Jun. 17, 2014, 4 pages.
GB Combined Search and Examination Report for GB Application No. 1421539.6 dated Jun. 5, 2015, 5 pages.
GB Search Report and Exam Report for GB Application No. GB1421537.0 dated Jun. 7, 2015, 5 pages.
GB Search Report dated Jun. 16, 2014 of Patent Application No. GB1321550.4 filed Dec. 16, 2013.
EP Search Report dated May 22, 2014 of Patent Application No. EP13275300.5 filed Dec. 6, 2013.
International Search Report and Written Opinion dated Jan. 29, 2015 of Application No. PCT/EP2014/076535 filed Dec. 4, 2014.
Rambo, Thomas J, "Flight Path Development for Remote Sensing Vehicles in a Moving Reference Frame", U.S. Appl. No. 61/837,620, filed Jun. 20, 2013.
Arbeit, Amy Calaire, "Unmanned Vehicle Searches", U.S. Appl. No. 61/872,340, filed Aug. 30, 2013.
Rambo, Thomas J, "Flight Path Development for Remote Sensing Vehicles in a Moving Reference Frame", U.S. Appl. No. 61/837,620, dated Jun. 20, 2013.
Arbeit, Amy Calaire, "Unmanned Vehicle Searches", U.S. Appl. No. 61/872,340, dated Aug. 30, 2013.

* cited by examiner

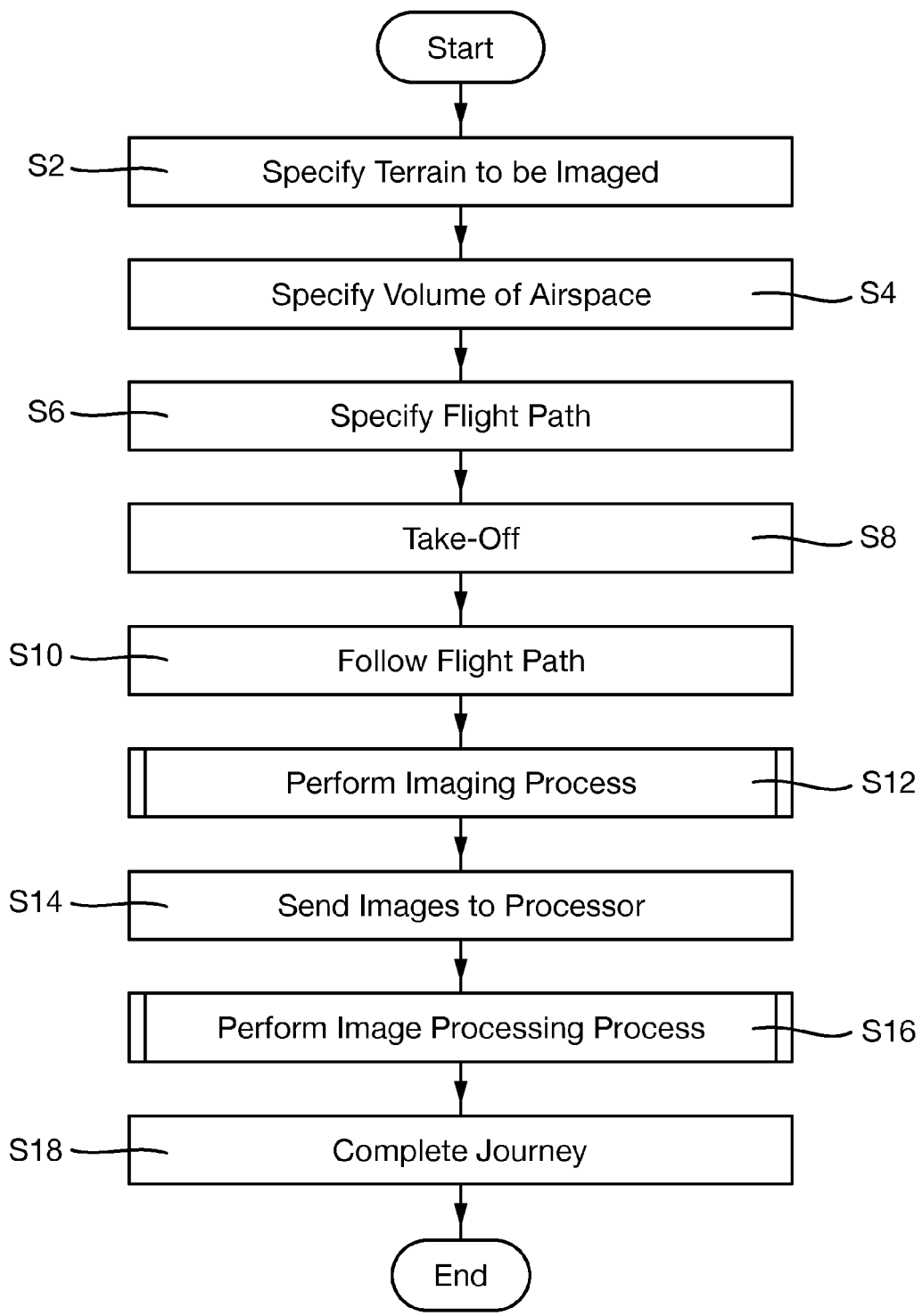

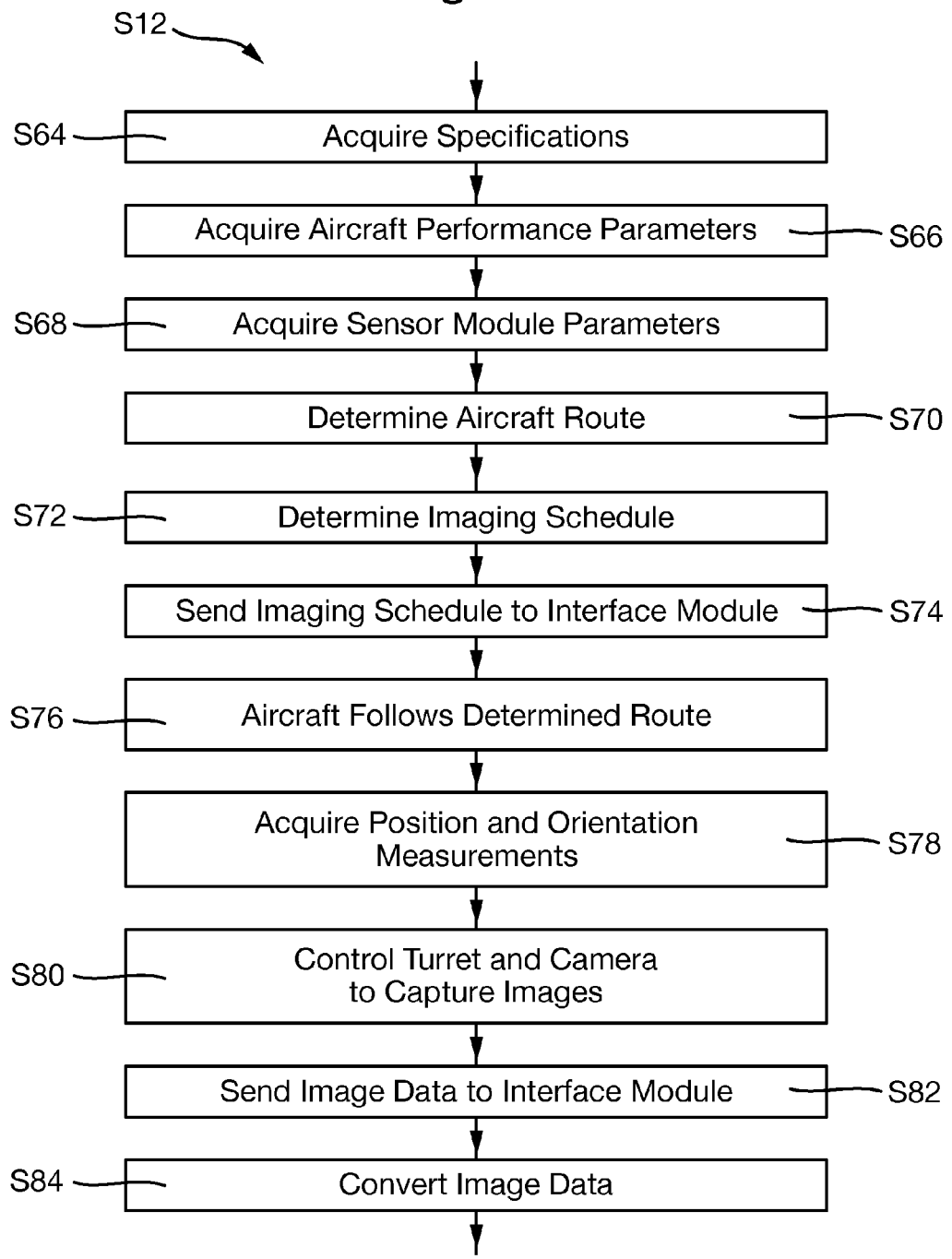

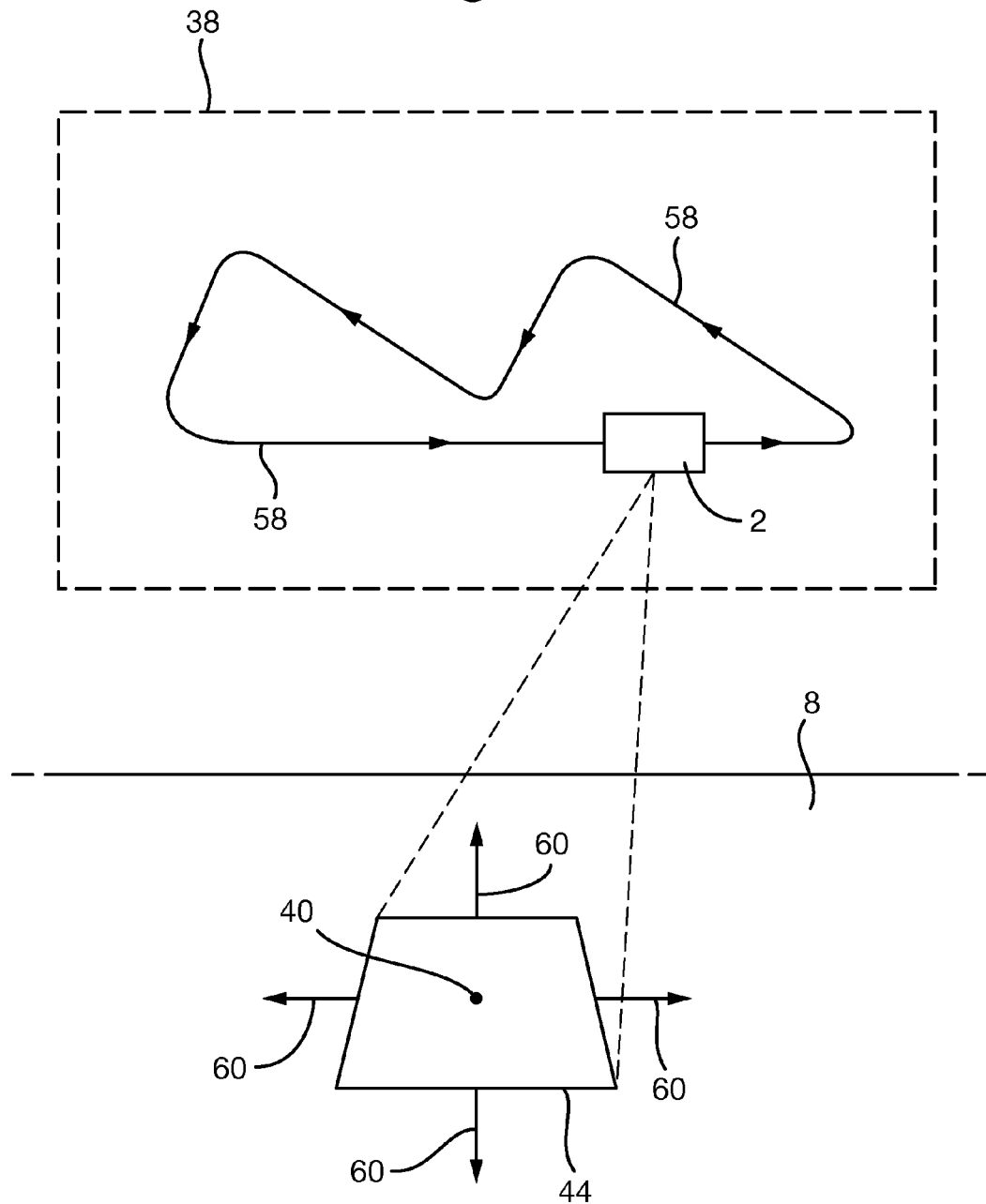

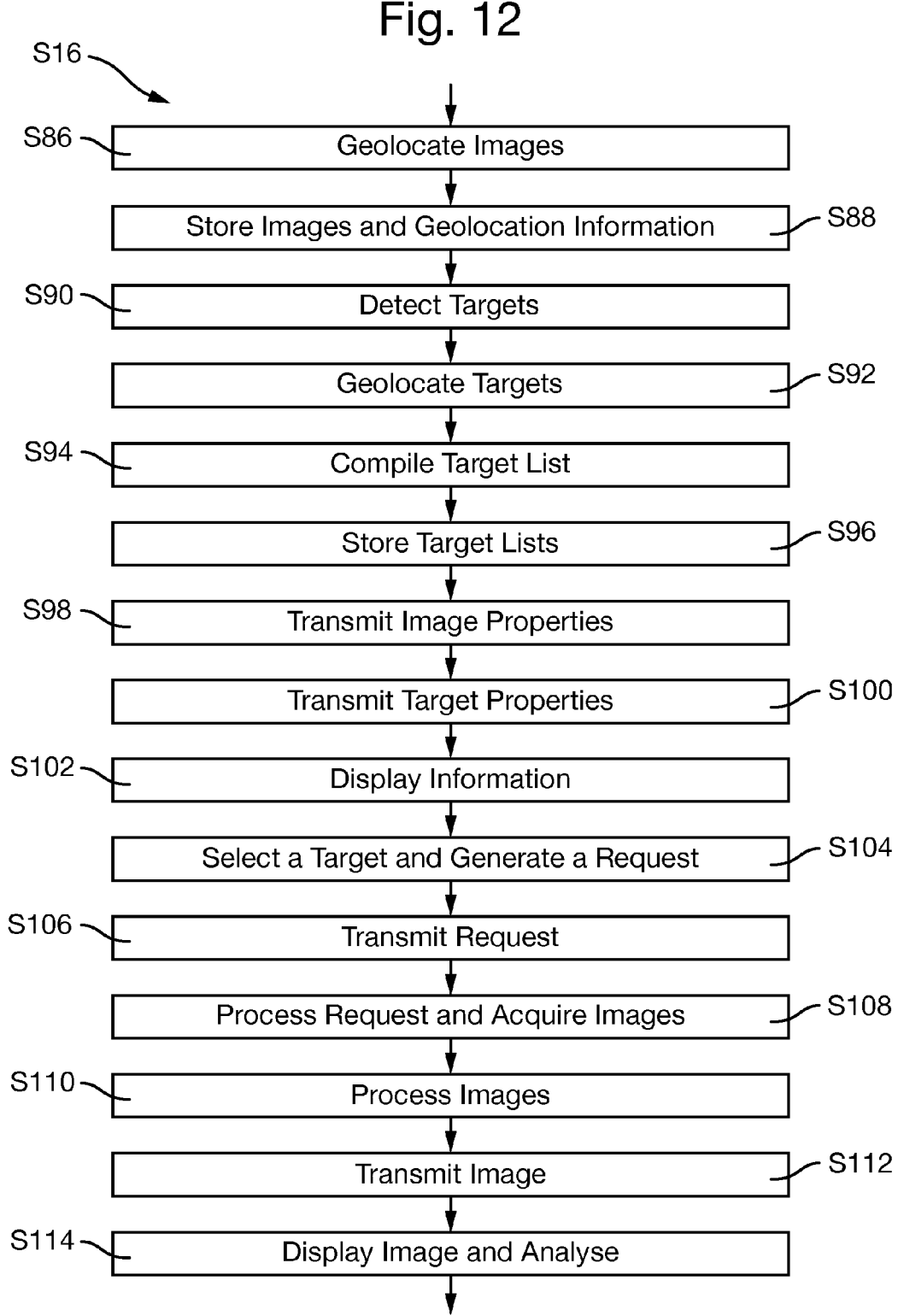

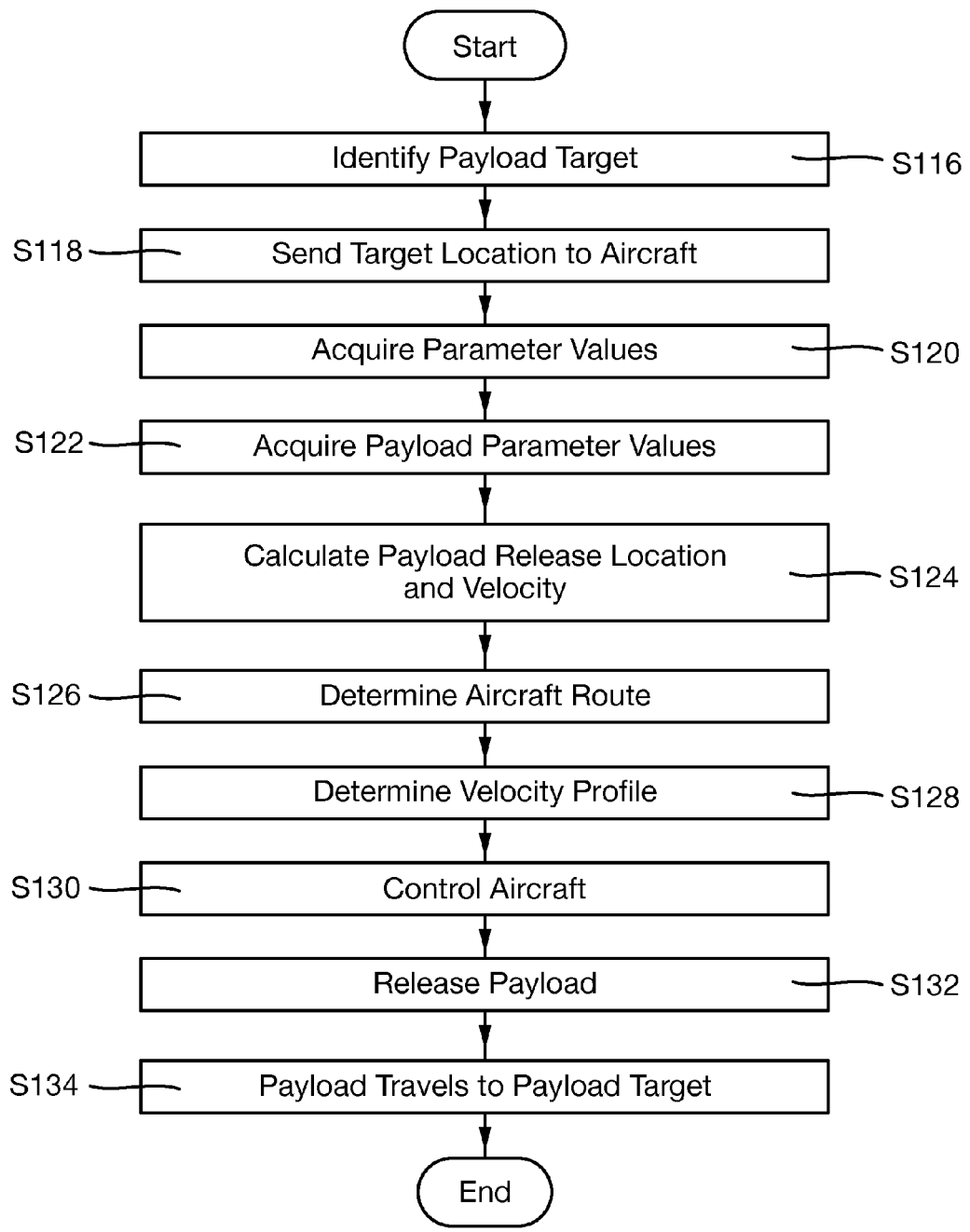

IMAGING METHOD AND APPARTUS

RELATED APPLICATIONS

This application is a national phase application filed under 35 USC § 371 of PCT Application No. PCT/EP2014/076535 with an International filing date of 4 Dec. 2014 which claims priority of GB Patent Application 1321550.4 filed 6 Dec. 2013 and EP Patent Application 13275300.5, also filed 6 Dec. 2013. Each of these applications is herein incorporated by reference in their entirety for all purposes.

FIELD OF THE INVENTION

The present invention relates to imaging linear features on the ground using sensors mounted on unmanned aircraft.

BACKGROUND

Unmanned Air Vehicles (UAVs) are commonly used to perform a variety of tasks. Such tasks include performing wide area searches of areas, surveillance operations, delivery of payloads, etc.

Conventionally, procedures to be performed by a UAV in order to complete a task are determined by a human operator and typically involve the direct control, by the human operator, of the UAV and on-board sensors. Such procedures may include, for example, the remote flying of the UAV by the operator to follow a route, and/or the moving of on-board sensors etc.

Furthermore, typically data gathered by a UAV (e.g. using on-board sensor systems) is transmitted to an entity remote from the UAV for analysis.

However, the manual control of a UAV and the transmission of data gathered by that UAV tend to require relatively high band-width communication.

SUMMARY OF THE INVENTION

In a first aspect, the present invention provides an imaging method for capturing images using a sensor mounted on an unmanned aircraft. The method comprises: acquiring, by one or more processors, a specification of possible positions and orientations relative to the aircraft to which the sensor may be moved; acquiring, by the one or more processors, a specification of the manoeuvrability of the aircraft; acquiring, by the one or more processors, a specification of a linear path along the ground; using the specification of the manoeuvrability of the aircraft and the specification of the path, determining, by the one or more processors, that the path includes a portion having a radius of curvature that is smaller than a minimum turning radius of the aircraft; and, using the acquired specification of the possible positions and orientations of the sensor relative to the aircraft, the acquired specification of the path, and the acquired specification of the manoeuvrability of the aircraft, determining, by the one or more processors, a route for the aircraft and an imaging schedule for the sensor. Determining the route comprises, responsive to determining that the path includes a portion having a radius of curvature that is smaller than a minimum turning radius of the aircraft, including, in the route, a loop. The method further comprises: following, by the aircraft, the route; and, whilst the aircraft follows the route, performing, by the sensor, the imaging schedule including the sensor moving with respect to the aircraft such that, for each point along the path, that point is coincident with a footprint of the sensor on the ground for at least some time during the procedure, and the sensor capturing images such that each point along the path is present within at least one of the captured images, wherein the portion of the path that has a radius of curvature that is smaller than a minimum turning radius of the aircraft is imaged as the aircraft flies along the loop.

The aircraft being able to continuously image a linear path that includes turns or bends having turn radii less than the minimum turn radius of the aircraft tends to improves surveillance, search, and target tracking capabilities of the aircraft.

The one or more processors may be located on-board the aircraft.

The method may further comprise acquiring, by the one or more processors, a specification of a volume of airspace. The step of determining the route and imaging schedule may comprise using the specification of the volume of airspace such that the route is wholly within the volume of airspace.

The method may further comprise: for each image in the set, determining, by the one or more processors, a set of properties of that image; performing, by the one or more processors, a target detection process on the set of images to detect one or more first targets within the set of images; for each detected first target, determining, by the one or more processors, a set of properties of that first target; transmitting, by a transmitter on-board the aircraft, for use by an entity remote from the aircraft, the determined image properties; transmitting, by the transmitter, for use by the entity, the determined first target properties; by the entity, using the received image properties and first target properties, identifying a region of interest on the ground; sending, from the entity to the aircraft, a request for image data relating to the region of interest; receiving, by a receiver on-board the aircraft, the request; and, in response to receiving the request, transmitting, by the transmitter, for use by the entity, the image data relating to the determined region of interest.

The method may further comprise: processing the captured images to detect, within at least one image, a second target; acquiring, by the one or more processors, a position on the ground of the detected second target; using the acquired specification of the possible positions and orientations of the sensor relative to the aircraft, the acquired position of the second target, and the specification of the manoeuvrability of the aircraft, determining, by the one or more processors, a procedure to be performed by the aircraft; performing, by the aircraft, the procedure; and, whilst the aircraft performs the procedure, capturing, by the sensor, a further set of images; wherein the procedure comprises the aircraft moving with respect to the second target and the sensor moving with respect to the aircraft such that the second target is coincident with a footprint of the sensor on the ground for the entire duration of the procedure; and capturing the further set of images is performed such that the whole of the second target is present within each image in the further set.

The method may further comprise: processing the captured images to detect, within at least one image, a third target; acquiring, by the one or more processors, a position on the ground of the detected third target; acquiring, by the one or more processors, a specification of a direction relative to the aircraft in which an exhaust of the aircraft points; and, using the acquired position of the third target, the specification of the manoeuvrability of the aircraft, and the acquired specification of the direction, determining by the one or more processors, a further route for the aircraft; and following, by the aircraft, the further route; wherein the determination of the further route comprises minimising a duration for which the exhaust of the aircraft is directed towards the third target.

The aircraft may comprise a payload releasably attached to the aircraft. The method may further comprise: processing the captured images to detect, within at least one image, a fourth target; acquiring, by the one or more processors, a position on the ground of the detected fourth target; acquiring, by the one or more processors, parameter values relating to properties of the payload; acquiring, by the one or more processors, parameter values relating to environmental conditions in which the aircraft is flying; using the acquired position of the fourth target, the acquired parameter values relating to properties of the payload, and the acquired parameter values relating to environmental conditions, determining, by the one or more processors, a position and a velocity for the aircraft; using the determined position and velocity for the aircraft, determining, by the one or more processors, a further procedure for the aircraft; performing, by the aircraft, the further procedure; and, at a point in the further procedure that the aircraft has the determined position and velocity, releasing, by the aircraft, the payload. The determined position and a velocity for the aircraft may be such that, were the aircraft to release the payload whilst located at the determined position and travelling at the determined velocity, the payload would land on the ground within a predetermined distance of the fourth target; and the further procedure is such that, were the aircraft (2) to perform the further procedure, at at least one instance during the further procedure, the aircraft would be located at the determined position and travelling at the determined velocity.

The step of capturing the set of images may comprise, for each image: acquiring, by one or more processors, a specification of a region on the ground to be imaged; measuring, by a position sensor fixedly mounted to a rigid support structure, a position of the position sensor; measuring, by an orientation sensor fixedly mounted to the rigid support structure, an orientation of the orientation sensor; using the measured position and orientation and using the acquired region specification, determining, a position and orientation for the sensor, the sensor being fixedly mounted to the rigid support structure; and controlling the aircraft and the orientation of the sensor on-board the aircraft such that the sensor has the determined position and orientation, thereby providing that a footprint of the sensor on the ground is coincident with the region on the ground to be imaged; and, when the sensor has the determined position and orientation, capturing, by the sensor, one or more images of the area of the ground within the sensor footprint. The rigid support structure may be releasably coupled to the airframe of the aircraft.

The path along the ground may follow a terrain feature or a border of a country.

The aircraft may be an autonomous unmanned aircraft.

In a further aspect, the present invention provides apparatus for capturing images. The apparatus comprises a sensor mounted on-board an unmanned aircraft. The apparatus further comprises one or more processors configured to: acquire a specification of possible positions and orientations relative to the aircraft to which the sensor may be moved; acquire parameter values relating to the manoeuvrability of the aircraft; acquire a specification of a linear path along the ground; using the specification of the manoeuvrability of the aircraft and the specification of the path, determine that the path includes a portion having a radius of curvature that is smaller than a minimum turning radius of the aircraft; and, using the acquired specification of the possible positions and orientations of the sensor relative to the aircraft, the acquired specification of the path, and the specification of the manoeuvrability of the aircraft, determine a route for the aircraft to follow and an imaging schedule for the sensor. Determining the route comprises, responsive to determining that the path includes a portion having a radius of curvature that is smaller than a minimum turning radius of the aircraft, including in the route including a loop. The apparatus further comprises means for controlling the aircraft to follow the route. The sensor is configured to, whilst the aircraft follows the route, perform the imaging schedule including the sensor moving with respect to the aircraft such that, for each point along the path, that point is coincident with a footprint of the sensor on the ground for at least some time during the procedure, and the sensor capturing images such that each point along the path is present within at least one of the captured images, wherein the portion of the path that has a radius of curvature that is smaller than a minimum turning radius of the aircraft is imaged as the aircraft flies along the loop.

In a further aspect, the present invention provides an aircraft (e.g. an unmanned autonomous aircraft) comprising apparatus according to the preceding aspect.

In a further aspect, the present invention provides an imaging method for capturing images using a sensor mounted on an unmanned aircraft (e.g. an autonomous unmanned aircraft). The method comprises: acquiring, by one or more processors, a range of motion of the sensor relative to the aircraft (i.e. information that defines or specifies possible positions and orientations relative to the aircraft to which the sensor may be moved); acquiring, by the one or more processors, a specification of a path along the ground (such as a river, canal or other elongate natural feature, or a man-defined elongate feature such as a border between two countries); acquiring, by the one or more processors, parameter values relating to the manoeuvrability of the aircraft; using the acquired range of motion of the sensor, the acquired specification of the path, and the acquired parameter values relating to the manoeuvrability of the aircraft, determining, by the one or more processors, a procedure to be performed by the aircraft; performing, by the aircraft, the determined procedure; and, whilst the aircraft performs the procedure, capturing, by the sensor, a set of images. The procedure comprises the aircraft moving with respect to the path along the ground and the sensor moving with respect to the aircraft such that, for each point along the path, that point is coincident with a footprint of the sensor on the ground for at least some time during the procedure. Capturing the images is performed such that each point along the path is present within at least one of the captured images.

The one or more processors may be located on-board the aircraft.

The step of determining the procedure may comprise determining a route for the aircraft to follow and determining an imaging schedule for the sensor. The step of the performing, by the aircraft, the procedure may comprise the aircraft following the route. The step of capturing, by the sensor, the images may be performed in accordance with the determined imaging schedule.

The method may further comprise determining, by the one or more processors, that the path along the ground includes a portion having a radius of curvature that is smaller than a minimum turning radius of the aircraft. The step of determining the route for the aircraft to follow may comprise including in the route a loop. The imaging schedule may specify that the portion of the path that has a radius of curvature that is smaller than a minimum turning radius of the aircraft is imaged as the aircraft flies along the loop.

The method may further comprise acquiring, by the one or more processors, a specification of a volume of airspace. The step of determining the procedure may comprise using the specification of the volume of airspace. The procedure may be such that the aircraft remains with the volume of airspace during the performance of the procedure.

The method may further comprise: for each image in the set, determining, by the one or more processors, a set of properties of that image; performing, by the one or more processors, a target detection process on the set of images to detect one or more first targets within the set of images; for a each detected first target, determining, by the one or more processors, a set of properties of that first target; transmitting, by a transmitter on-board the aircraft, for use by an entity remote from the aircraft, the determined image properties; transmitting, by the transmitter, for use by the entity, the determined first target properties; by the entity remote from the aircraft, using the received image properties and first target properties, identifying a region of interest on the ground; sending, from the entity to the aircraft, a request for image data relating to the region of interest; receiving, by a receiver on-board the aircraft, the request; and, in response to receiving the request, transmitting, by the transmitter, for use by the entity, the image data relating to the determined region of interest.

The method may further comprise: processing the captured images to detect, within at least one image, a second target; acquiring, by the one or more processors, a position on the ground of the detected second target; using the acquired range of motion of the sensor, the acquired position of the second target, and the acquired parameter values relating to the manoeuvrability of the aircraft, determining, by the one or more processors, a further procedure to be performed by the aircraft; performing, by the aircraft, the further procedure; and, whilst the aircraft performs the further procedure, capturing, by the sensor, a further set of images. The further procedure may comprise the aircraft moving with respect to the second target and the sensor moving with respect to the aircraft such that the second target is coincident with a footprint of the sensor on the ground for the entire duration of the further procedure. Capturing the further set of images may be performed such that the whole of the second target is present within each image in the further set.

The method may further comprise: processing the captured images to detect, within at least one image, a third target; acquiring, by the one or more processors, a position on the ground of the detected third target; acquiring, by the one or more processors, a specification of a direction relative to the aircraft in which an exhaust of the aircraft points; using the acquired position of the third target, the acquired parameter values relating to the manoeuvrability of the aircraft, and the acquired specification of the direction, determining by the one or more processors, a route for the aircraft; and following, by the aircraft, the determined route. The determination of the route may comprise minimising a duration for which the exhaust of the aircraft is directed towards the third target.

The aircraft may comprise a payload releasably attached to an aircraft, and the method may further comprise: processing the captured images to detect, within at least one image, a fourth target; acquiring, by the one or more processors, a position on the ground of the detected fourth target; acquiring, by the one or more processors, parameter values relating to properties of the payload; acquiring, by the one or more processors, parameter values relating to environmental conditions in which the aircraft is flying; using the acquired position of the fourth target, the acquired parameter values relating to properties of the payload, and the acquired parameter values relating to environmental conditions, determining, by the one or more processors, a position and a velocity for the aircraft; using the determined position and velocity for the aircraft, determining, by the one or more processors, a second further procedure for the aircraft; performing, by the aircraft, the second further procedure; and, at a point in the second further procedure that the aircraft has the determined position and velocity, releasing, by the aircraft, the payload. The determined position and a velocity for the aircraft may be such that, were the aircraft to release the payload whilst located at the determined position and travelling at the determined velocity, the payload would land on the ground within a predetermined distance of the fourth target. The second further procedure may be such that, were the aircraft to perform the second further procedure, at at least one instance during the second further procedure, the aircraft would be located at the determined position and travelling at the determined velocity.

The step of capturing the set of images may comprise, for each image: acquiring, by one or more processors, a specification of a region on the ground to be imaged; measuring, by a position sensor fixedly mounted to a rigid support structure, its position; measuring, by an orientation sensor fixedly mounted to the rigid support structure, its orientation; using the measured position and orientation and using the acquired region specification, determining, a position and orientation for the sensor, the sensor being fixedly mounted to the rigid support structure; controlling the aircraft and the orientation of the sensor on-board the aircraft such that the sensor has the determined position and orientation, thereby providing that a footprint of the sensor on the ground is coincident with the region on the ground to be imaged; and, when the sensor has the determined position and orientation, capturing, by the sensor, one or more images of the area of the ground within the sensor footprint.

The path along the ground may follow the path of a terrain feature or a border of a country.

In a further aspect, the present invention provides apparatus for capturing images, the apparatus comprising: a sensor mounted on-board an aircraft; one or more processors configured to acquire a range of motion of the sensor relative to the aircraft (i.e. information that defines or specifies possible positions and orientations relative to the aircraft to which the sensor may be moved); acquire a specification of a path along the ground, acquire parameter values relating to the manoeuvrability of the aircraft, and, using the acquired range of motion of the sensor, the acquired specification of the path, and the acquired parameter values relating to the manoeuvrability of the aircraft, determine a procedure to be performed by the aircraft; and means for controlling to aircraft to perform the determined procedure. The sensor is configured to, whilst the aircraft performs the procedure, capture a set of images. The procedure comprises the aircraft moving with respect to the path along the ground and the sensor moving with respect to the aircraft such that, for each point along the path, that point is coincident with a footprint of the sensor on the ground for at least some time during the procedure. Capturing the images is such that each point along the path is present within at least one of the captured images.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the preceding aspect.

BRIEF DESCRIPTION OF THE DRAWINGS

FIG. 4 is a process flow chart showing certain steps of a process in which an imaging process is performed;

FIG. 10 is a process flow chart showing certain steps in a third embodiment of the imaging process;

FIG. 11 is a schematic illustration (not to scale) of the aircraft performing a surveillance operation;

FIG. 12 is a process flow chart showing certain steps of an image processing method; and FIG. 13 is a process flow chart showing certain steps of a payload delivery process.

DETAILED DESCRIPTION

Figure 1:
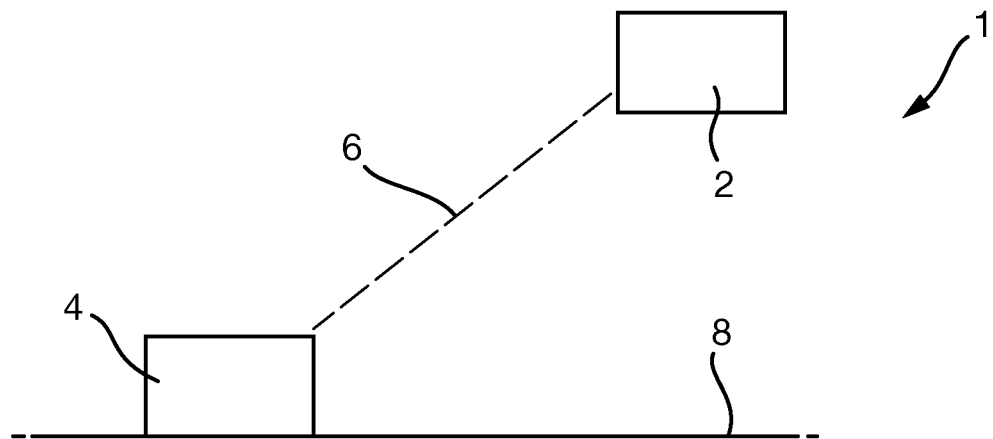
FIG. 1 is a schematic illustration (not to scale) showing a scenario.

FIG. 1 is a schematic illustration (not to scale) showing an example scenario 1 in which embodiments of an imaging process is to be implemented.

The scenario 1 comprises an aircraft 2 and a ground station 4.

The aircraft 2 is described in more detail later below with reference to FIG. 2.

In the scenario 1, as described in more detail later below as the aircraft 2 is airborne, systems on board the aircraft 2 capture high resolution visible band images of an area on the ground 8. Processed image data is then sent from the aircraft 2 to the ground station 4 via a wireless communications link 6.

In the scenario 1, the ground station 4 is located on the ground 8 and is remote from the aircraft 2.

Figure 2:
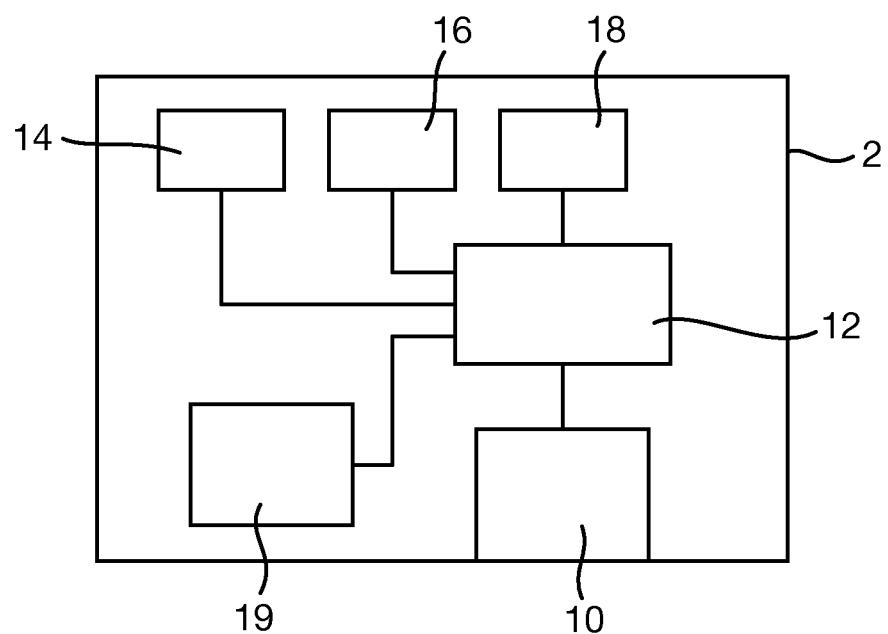
FIG. 2 is a schematic illustration (not to scale) of an aircraft.

FIG. 2 is a schematic illustration (not to scale) of the aircraft 2. The imaging process performed by the aircraft 2 in this scenario 1 will be described in more detail later below with reference FIG. 5.

The aircraft 2 is an unmanned aircraft. The aircraft 2 comprises a sensor module 10, a processor 12, a storage module 14, a plurality of aircraft subsystems (which are hereinafter collectively referred to as "the aircraft subsystems" and indicated in FIG. 1 by a single box and the reference numeral 16), a transceiver 18, and a payload 19.

The sensor module 10 is described in more detail later below with reference to FIG. 3. In this embodiment, the sensor module 10 is connected to the processor 12 such that information may be sent between the sensor module 10 and the processor 12.

In this embodiment, the processor 12 is configured to process information received by it as described in more detail later below. In addition to being connected to the sensor module 10, the processor 12 is connected to the storage module 14 such that information may be sent from the processor 12 to the storage module 14 (for storage by the storage module 14) and such that information stored by the storage module 14 may be acquired by the processor 12. The processor 12 is further connected to the aircraft subsystems 16 such that information may be sent between the processor and the aircraft subsystems 16. The processor 12 is further connected to the transceiver 18 such that information may be sent between the processor 12 and the transceiver 18. The processor 12 is further connected to the payload 19 such that information may be sent between the processor 12 and the payload 19.

In this embodiment, the storage module 14 is configured to store information received from the processor 12.

In this embodiment, the aircraft subsystems 16 include, but are not limited to, a propulsion system of the aircraft 2, a power system of the aircraft 2, a fuel system of the aircraft 2, and a navigation system of the aircraft 2. The propulsion system may, for example, include primary and auxiliary propulsion units for generating thrust and/or lift. In this embodiment, the propulsion system includes sensing apparatus from which data relating to the propulsion of the aircraft 2 (e.g. the aircraft's speed) may be acquired. The power system may comprise electrical power and power distribution systems for providing electrical power to other aircraft systems. In this embodiment, the power system includes sensing apparatus from which data relating to a state or operations of the power system may be acquired. The fuel system may comprise fuel storage (such as fuel tanks), monitoring (such as fuel level, temperature and/or pressure sensors), and distribution systems (such as supply lines). In this embodiment, the fuel system includes sensing apparatus from which data relating to the fuel system may be acquired. In this embodiment, the navigation system includes sensing apparatus for determining, at least, a global position of the aircraft 2 (e.g. a Global Positioning System receiver), an altitude of the aircraft 2, and a heading of the aircraft 2.

In this embodiment, the transceiver 18 is configured to receive information from an entity that is remote from the aircraft 2 and relay that information to the processor 12. Also, the transceiver 18 is configured to transmit, for use by an entity that is remote from the aircraft 2, information received by the transceiver 18 from the processor 12.

In this embodiment, the payload 19 may be any appropriate type of load or cargo, such as a container containing food supplies or equipment. The payload 19 may be a lethal effector or a non-lethal effector.

In this embodiment, the processor 12 may operate so as to release the payload 19 from the aircraft in flight so that the payload 19 is free to move away from the aircraft 2. In some embodiments, the payload 19 is a "dumb" payload. In some embodiments, the payload 19 is a steered payload and may be controlled, e.g. by the processor 12, so as to change direction after it has been released from the aircraft 2. In some embodiments, the payload 19 is a guided payload. In some embodiments, the payload 19 may include a parachute which may be deployed after the payload 19 is released from the aircraft 2 so as to slow the decent of the payload 19 from the aircraft 2 to the ground 8.

Figure 3:
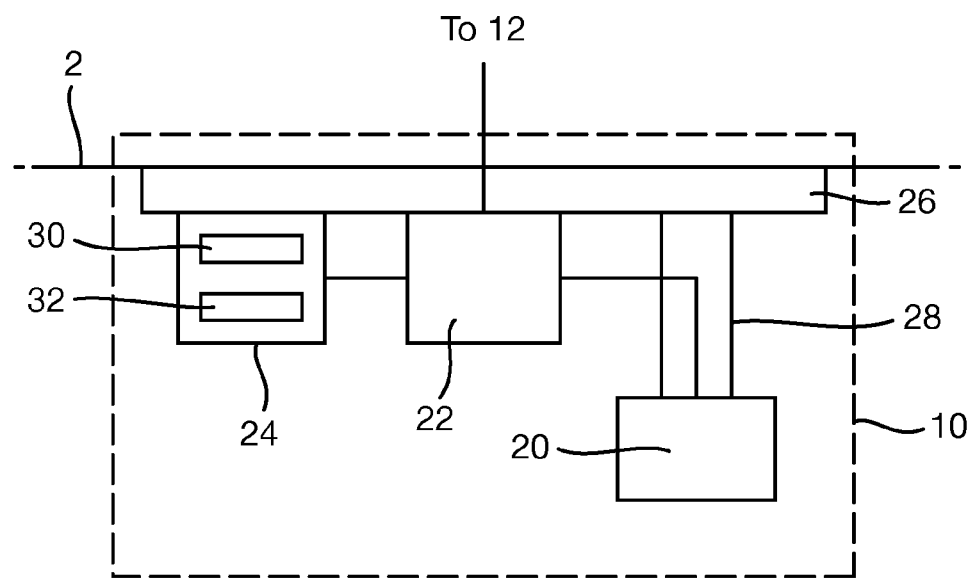
FIG. 3 is a schematic illustration (not to scale) of a sensor module.

FIG. 3 is a schematic illustration (not to scale) showing the sensor module 10. In this embodiment, the sensor module 10 is detachable from the aircraft fuselage and may, e.g., be replaced by a further sensor module comprising a different type of sensor.

In this embodiment, the sensor module 10 comprises a camera 20, an interface module 22, a position and orientation module 24, a rigid support structure 26, and a moveable turret 28.

In this embodiment, the camera 20 is a visible light detecting camera configured to capture visible light images as described in more detail later below. The camera 20 is mounted to the turret 28 such that, by moving or steering the turret 28, the position and orientation of the camera 20 relative to the support structure 26 may be changed. In other words, by steering the turret 28, the facing of the camera 20 may be changed. In this embodiment, the camera 20 is connected to the interface module 22 such that, as described in more detail later below, a control signal may be sent from the interface module 22 to the camera 20 and such that image data may be sent from the camera 20 to the interface module 22.

In this embodiment, the interface module 22 is configured to process information received by the interface module 22 as described in more detail later below. In this embodiment, the interface module 22 is mounted to the support structure 26 such that the interface module 22 has a fixed position and orientation relative to the support structure 26. In addition to being connected to the camera 20, the interface module 22 is connected to the processor 12 such that information may be sent between the interface module 22 and the processor 12. The interface module 22 is also connected to the position and orientation module 24 such that information may be sent between the interface module 22 and the position and orientation module 24.

In this embodiment, the position and orientation module 24 comprises a position sensor 30 and an orientation sensor 32. The position sensor 30 is configured to measure a global position of the position sensor 30. The position sensor 30 may, for example, include a GPS receiver. The orientation sensor 32 is configured to measure an orientation of the orientation sensor 32. The orientation sensor may, for example, include a compass. In this embodiment, the position and orientation module 24 is mounted to the support structure 26 such that the position sensor 30 and an orientation sensor 32 each have a fixed position and orientation relative to the support structure 26.

In this embodiment, the turret 28 is a steerable sensor turret. The turret 28 is attached between the camera 20 and the support structure 26 such that, by steering the turret 28 such that, by steering the turret 28, the facing of the camera 20 with relative to the support structure 26 may be altered. In this embodiment, the turret 28 is connected to the interface module 24 such that a control signal (i.e. a signal for steering the turret 28) may be sent from the interface module 24 to the turret 28. The turret 28 is configured to operate in accordance with a received control signal.

In this embodiment the turret 28 is a gimballed sensor turret configured to allow for rotation of the camera 20 around multiple (e.g. two or three) orthogonal axes with respect to the support structure 26. For example, the turret 28 may comprise three gimbals coupled together such that the pivot axes of the gimbals are orthogonal to one another.

In this embodiment, the rigid support structure 26 is fixedly attached to the fuselage of the aircraft 2. The support structure 26 is resistant to bending and flexing as the aircraft 2 flies.

In some embodiments, the turret 28 is attached directly to the fuselage of the aircraft 2, i.e. the rigid support structure 26 may be omitted.

In operation, as the aircraft 2 flies in the proximity of an area of terrain or a terrain feature, the camera 20 captures high resolution visible band images of that area of terrain or terrain feature, as described in more details later below. The area of terrain or terrain feature that is imaged using the camera 20 is hereinafter referred to as the "imaging target". Data corresponding to the images captured by the camera 20 is sent from the camera 20 to the processor 12. The processor 12 is used to perform an image processing method on the received data.

In this embodiment, during the image processing method, processed data is sent from the processor 12 to the storage module 14 where it is stored, as described in more detail later below. Also, processed data is sent from the processor 12 to the transceiver 18 where it is transmitted to the ground station 4.

FIG. 4 is a process flow chart showing certain steps of a process performed by the entities in the scenario 1.

At step s2, a specification of the imaging target that is to be imaged is provided to the aircraft 2. In this embodiment, the specification of the imaging target is stored in the storage module 14. In this embodiment, the specification of the imaging target is loaded onto the aircraft 2 prior to the aircraft 2 taking off. However, in other embodiments, the specification of the imaging target may be transmitted to the aircraft 2, e.g. from the ground station 4, while the aircraft 2 is airborne.

The imaging target may, for example, be specified using global coordinates (i.e. latitudes and longitudes).

At step s4, a specification of a volume of airspace in which the aircraft 2 is permitted to fly whilst imaging the imaging target is provided to the aircraft 2. In this embodiment, the specification of the volume of airspace is stored in the storage module 14. In this embodiment, the specification of the volume of airspace is loaded onto the aircraft 2 prior to the aircraft 2 taking off. However, in other embodiments, the specification of the volume of airspace may be transmitted to the aircraft 2, e.g. from the ground station 4, while the aircraft 2 is airborne.

The volume of airspace may, for example, be specified using global coordinates and altitudes.

At step s6, a sequence of waypoints is provided to the aircraft 2. In this embodiment, a waypoint is a point in the air that the aircraft 2 is to fly through, or within a predetermined distance of. The sequence of waypoints define a flight-path for the aircraft from the aircraft's take-off point, to a point within, or within a predetermined distance of, the volume of airspace specified at step s4.

In this embodiment, the specification of the sequence of waypoints is stored in the storage module 14. In this embodiment, the specification of the sequence of waypoints is loaded onto the aircraft 2 prior to the aircraft 2 taking off. However, in other embodiments, the specification of the sequence of waypoints may be transmitted to the aircraft 2, e.g. from the ground station 4, while the aircraft 2 is airborne.

The sequence of waypoints may, for example, be specified using global coordinates and altitudes. In some embodiment, one or more of the waypoints may be a different type of point that can be used to define a route for the aircraft 2. For example, in some embodiments, a waypoint is a point on the ground over which the aircraft 2 is to fly.

In this embodiment, steps s2 to s6 are performed prior to the aircraft 2 taking off. However, in other embodiments the data corresponding to one or more of the waypoints, the imaging target, and/or the volume of airspace may be provided to the aircraft 2 at a different time, for example when the aircraft 2 is airborne (in which case, this data may be provided to the aircraft 2 from the ground station 4 via the communications link 6). Thus, tasks can advantageously be uploaded whilst the aircraft 2 is airborne. Furthermore, tasks for the aircraft 2 can updated, modified, cancelled, replaced, added to etc. whilst the aircraft 2 is airborne.

At step s8, the aircraft 2 takes-off from the ground station 4.

At step s10, the aircraft 2 follows the flight path defined by the sequence of waypoints stored in the storage module 14 until the aircraft 2 enters the volume of airspace. In this embodiment, the aircraft 2 is unmanned and autonomous.

Figure 5:
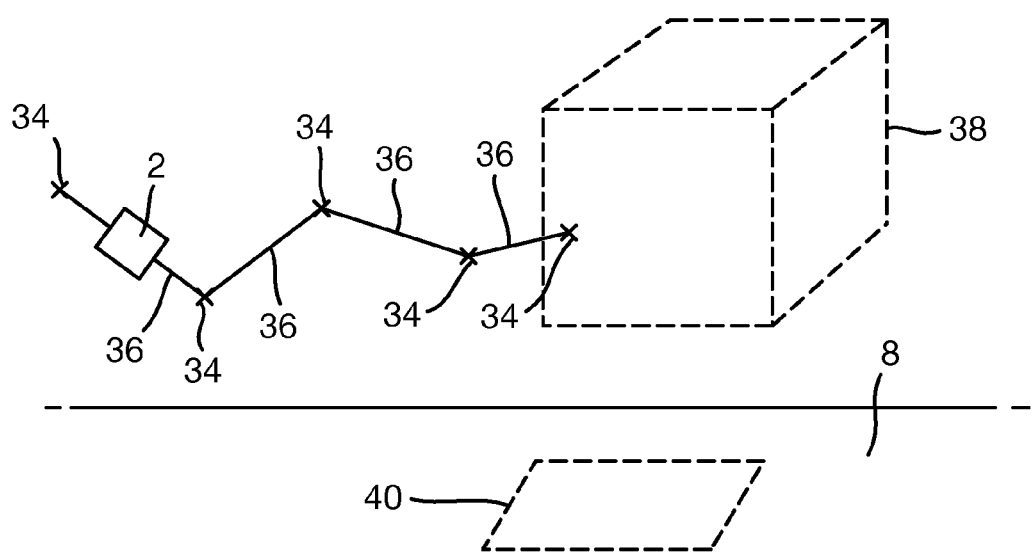
FIG. 5 is a schematic illustration (not to scale) showing the aircraft following a flight path defined by the waypoints.

FIG. 5 is a schematic illustration (not to scale) showing the sequence of waypoints 34 followed by the aircraft 2. In this embodiment, the flight path 36 defined by the waypoints 34 is followed by the aircraft 2 until the aircraft 2 enters the volume of airspace 38. FIG. 5 further shows the imaging target 40.

At step s12, upon entering the volume of airspace 38, the aircraft performs an imaging process to capture images of the imaging target 40. In this embodiment, the sensor module 10 captures images of the imaging target 40.

A first embodiment of the imaging process is described in more detail later below with reference to FIGS. 6 and 7.

A second embodiment of the imaging process is described in more detail later below with reference to FIGS. 8 and 9.

A third embodiment of the imaging process is described in more detail later below with reference to FIGS. 10 and 11.

At step s14, the sensor module 10 sends the captured images to the processor 12.

At step s16 the processor 12 performs an image processing method on the received images.

An embodiment of an image processing method is described in more detail later below with reference to FIG. 12.

At step s18, the aircraft 2 completes its journey, for example, by returning to its launch-site (e.g. the ground station 4), for example, by following the flight path 36.

Thus, a process in which an imaging process is performed is provided.

What will now be described is a first embodiment of an imaging process performed at step s12.

In this first embodiment, the imaging target 40 is a relatively large defined area of terrain. In the first embodiment, the imaging of the imaging target 40 comprises conducting a "wide area search" of the imaging target 40. The terminology "wide area search" is used herein to refer to the reconnaissance of the imaging target 40 that includes taking images of the imaging target 40 such that each point in the imaging target 40 is contained in at least one of those images. In this embodiment, the relatively large defined area of terrain is such that the entirety of the area of terrain cannot be captured in a single image taken by the camera 20. In this embodiment, a wide area search further comprises processing the captured images to detect targets of interest within those images.

Figure 6:
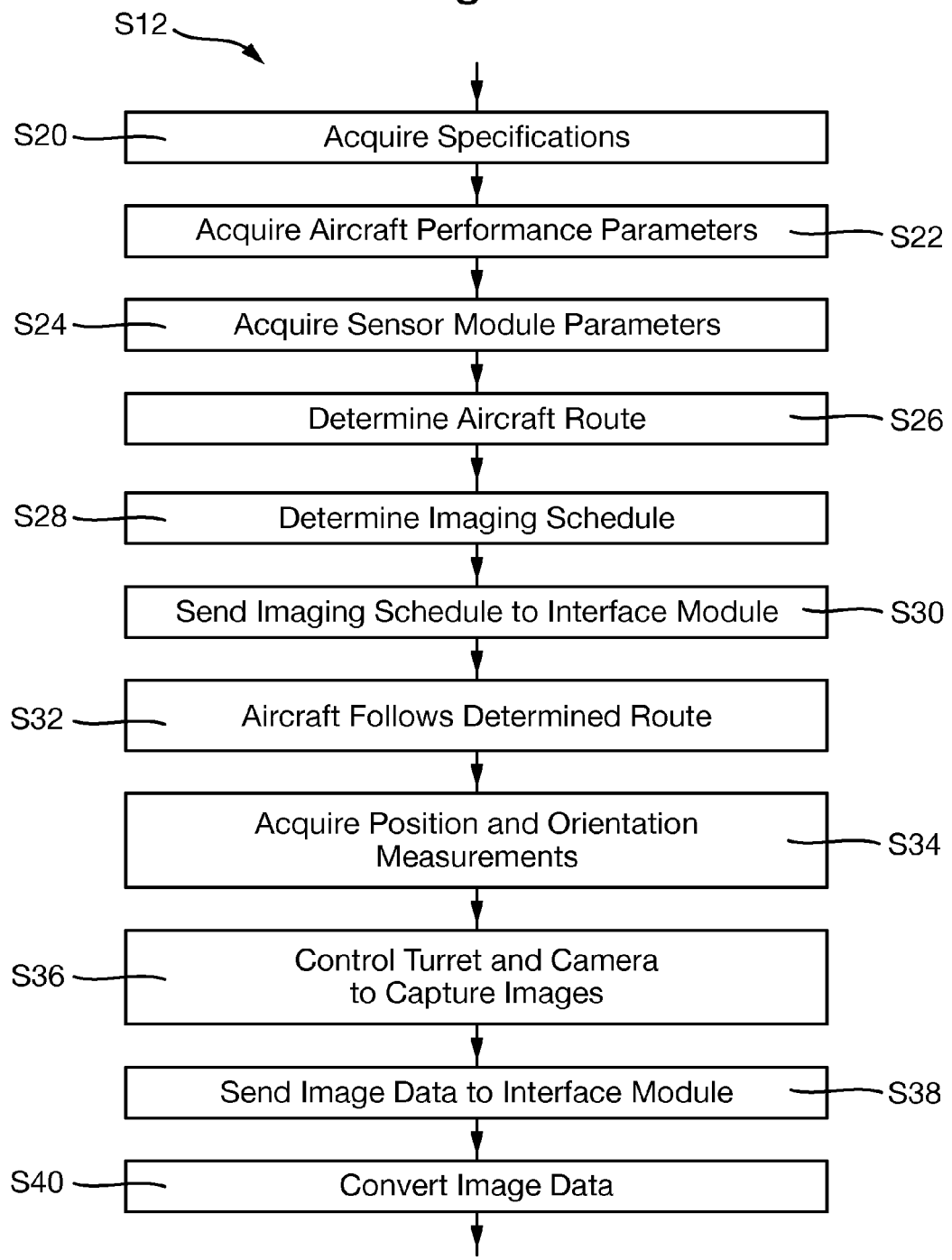
FIG. 6 is a process flow chart showing certain steps in a first embodiment of the imaging process.

FIG. 6 is a process flow chart showing certain steps in the first embodiment of the imaging process.

At step s20, the processor 12 acquires the specification for the imaging target 40 and the specification for the volume of airspace 38 that are stored in the storage module 14.

In this embodiment, the specification of the imaging target 40 includes global positions of points along the border of the imaging target 40, i.e. a definition of the border of the large defined area of terrain that is to be imaged.

At step s22, the processor 12 acquires current performance parameter values for the aircraft 2 from the aircraft subsystems 16. Examples of appropriate aircraft performance parameter values include, but are not limited to, velocities at which the aircraft 2 is capable of travelling, altitudes at which the aircraft 2 is capable of travelling, and a turning radius for the aircraft 2

At step s24, the processor 12 acquires performance parameter values for the sensor module 10 from the interface module 22. Examples of appropriate performance parameter values for the sensor module 10 include, but are not limited to, the frequency with which the camera 20 can capture images, a range of motion, or range of travel, of the turret 28 relative to the support structure 26, and a maximum speed at which the turret 28 may move.

The range of motion of the turret 28 may specify a distance (linear and/or angular), relative to the support structure 26, that the moveable turret 28 may travel while properly attached to the support structure 26. The range of motion of the turret 28 may specify, for each of one or more axes (e.g. multiple orthogonal axes), an angular distance about that axis relative to the support structure 26 that the turret 28 is capable of moving. The range of motion of the turret 28 may define the range of possible positions and facings relative to the support structure 26 that the camera 20 may occupy by operation of the turret 28.

In some embodiments, the aircraft 2 is required to perform the wide area search of the imaging target 40 within a pre-specified amount of time. In such embodiments, the processor 12 may also acquire a specification of this time period.

At step s26, using some or all of the information acquired at steps s20, s22, and s24, the processor 12 determines a route, hereinafter referred to as the "first route", within the volume of airspace 38 for the aircraft 2. The determined first route is such that, were the aircraft 2 to follow that route, the sensor module 10 would be capable of capturing images of the imaging target 40 such that each point in the imaging target 40 is contained within at least one of those images.

Further information about the first route determined by the processor 12 at step s26 is described in more detail later below with reference to FIG. 7.

At step s28, the processor 12 determines an imaging schedule, hereinafter referred to as the "first imaging schedule", for the sensor module 10. In this embodiment, the first imaging schedule specifies a sequence of points along the first route and, for each of those points, one or more regions within the imaging target 40 of which the camera 20 is to capture an image.

In this embodiment, the first imaging schedule is such that, were the camera 20 to capture images in accordance with that imaging schedule, each point on the ground 8 within the imaging target 40 would be contained within at least one of the captured images (i.e. a wide area search of the imaging target 40 would be performed).

Each of the sequence of points along the first route may be specified, for example, by an aircraft position (e.g. as GPS coordinates and an altitude). Each of the regions within the imaging target 40 that the camera 20 is to capture an image of may be specified by GPS coordinates for that region.

Further information about the first imaging schedule is described in more detail later below with reference to FIG. 7.

At step s30, the processor 12 sends the first imaging schedule to the interface module 22 of the sensor module 10.

At step s32, the aircraft 2 is controlled (e.g. by the processor 12) so as to follow the first route.

At step s34, as the aircraft 2 follows the first route, the interface module 22 acquires position and orientation measurements from the position and orientation module 24. In particular, the interface module 22 acquires position measurements from the position sensor 30 and orientation measurements from the orientation sensor 32.

In this embodiment, the position and orientation module 24 is fixed to the support structure 26. Also, the turret 28 is fixed to the support structure 26. Thus, using the acquired position and orientation measurements, and using a known positional relationship between the turret 28 and the position and orientation module 24, and using the known orientation of the turret 28 relative to the support structure 26, the interface module 22 is able to determine a current position and orientation for the camera 20.

At step s36, using the determined current position and orientation of the camera 20 and using the first imaging schedule received from the processor 12, as the aircraft 2 follows the first route, the interface module 22 controls the turret 28 and the camera 20 so as to capture images in accordance with the first imaging schedule.

For example, a step in the first imaging schedule may specify a region within the imaging target 40 of which an image is to be captured. Using specification of that region, the interface module 22 determines a position and orientation for the camera 20 that would provide that the specified region is wholly located in the camera's footprint on the ground 8. When that step in the first imaging schedule is reached, the interface module 22 controls the turret 28 so that the camera 20 has the determined position and orientation. Once the camera 20 has the desired position and orientation, the interface module 22 controls the camera 20 to capture one or more images of the specified region.

Further information about the capturing of images performed at step s36 is described in more detail later below with reference to FIG. 7.

At step s38, the camera 20 sends the captured images to the interface module 22.

At step s40, the interface module 22 processes the received images so as to convert those images into a predetermined format (e.g. a standardised format) that is usable by the processor 12.

After step s40, the method proceeds back to step s14 of FIG. 4, at which point the interface module 22 sends the converted images to the processor 12.

Thus, a first embodiment of the imaging process is provided.

Figure 7:
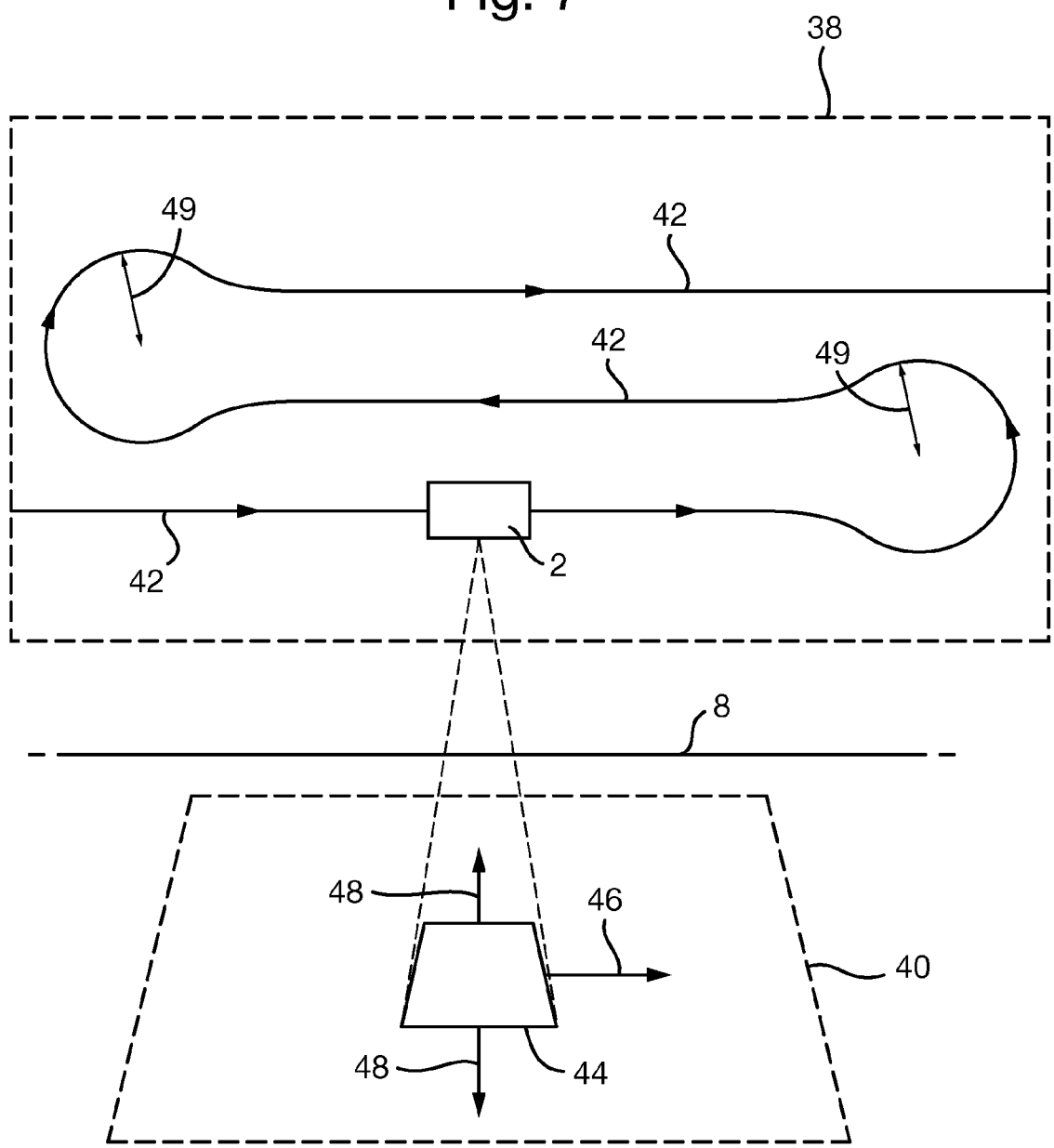
FIG. 7 is a schematic illustration (not to scale) of the aircraft performing a wide area search.

FIG. 7 is a schematic illustration (not to scale) of the aircraft 2 performing a wide area search of the imaging target 40, as described above with reference to FIG. 6.

In FIG. 7, the first route is indicated by the reference numeral 42. The direction of travel of the aircraft 2 along the first route 42 is indicated in FIG. 7 by arrow heads placed along the first route 42.

Also, in FIG. 7, the region of the ground 8 that is able to be imaged by the camera 20 at a particular time-step is indicated by the reference numeral 44. This region is referred to herein as the "camera footprint".

In this embodiment, the size of the camera footprint 44 on the ground 8 at a particular time-step is dependent on the position and orientation of the camera 20 relative to the aircraft 2 (which may be controlled by controlling the turret 28), the position and orientation of the aircraft 2 (including the altitude of the aircraft 2 above the ground 8), and the surface relief of the ground 8 (information relating to which may, for example, be loaded onto the aircraft 2 prior to take-off). The size of the camera footprint 44 on the ground 8 at a particular time-step may be determined by the processor 12.

In this embodiment, when viewed from above, the first route 42 is substantially S-shaped. The first route 42 comprises three parallel straight sections that are connected together by curved sections. In other embodiments, the first route 42 may have a different shape, for example, the first route 42 may include a different number of straight sections and curved sections.

As the aircraft 2 flies along the straight sections of the first route 42, the camera footprint 44 is moved over the imaging target 40 in the direction of travel of the aircraft 2 (as indicated in FIG. 7 by an arrow and the reference numeral 46). Also as the aircraft 2 flies along the straight sections of the first route 42, the turret 28 may be controlled such that the camera footprint 44 is swept back and forth in a direction that is perpendicular to the direction of travel of the aircraft 2 (as indicated in FIG. 7 by arrows the reference numerals 48). In this embodiment, the camera 20 is controlled so as to capture images of the imaging target 40 as the aircraft 2 flies along the straight sections of the first route 42. Thus, as the aircraft flies along the straight section of the first route 42 a strip of the imaging target 40 is imaged. In this embodiment, for each straight section of the first route 42, a length of the strip of the imaging target 40 that is imaged as the aircraft 2 flies along that straight sections is greater than or equal to the entire length of the imaging target 40.

In this embodiment, the distance between a straight section of the first route 42 and a subsequent straight section of the first route 42 is such that the strip of the imaging target 40 that is imaged while the aircraft 2 flies along the straight section overlaps at least to some extent with the strip of the imaging target 40 that is imaged while the aircraft 2 flies along the subsequent straight section.

In this embodiment, the number of straight sections is such that the entirety of the imaging target 40 is imaged during the straight sections of the first route 42.

In this embodiment, the curved sections of the first route 42 are sections at which the aircraft 2 turns, i.e. changes direction, between straight sections of the first route 42. Preferably, the first route 42 is determined such that the number of turns the aircraft 2 has to make is minimised. In this embodiment, the radius of each of the curved sections, which is denoted in FIG. 7 by double headed arrows and the reference numeral 49, is dependent upon the minimum turn radius of the aircraft 2. In particular, for each curved section of the first route 42, the radius 49 of that curved section is greater than or equal to the minimum turn radius of the aircraft 2.

By flying along the first route 42 and by controlling the turret 28, the camera footprint 44 is moved over the entirety of the imaging target 40. Thus, each point within the imaging target 40 is contained within at least one image taken by the camera 20.

In other embodiments, the first route 42 has a different shape to that described above. Also, in other embodiments, the turret 28 is controlled so as to move the camera footprint 44 in a different way to that described above, while still providing that each point within the imaging target 40 is contained within at least one image captured by the camera 20 as the aircraft 2 follows the first route 42.

In some embodiments, after following the first route 42 and imaging the entirety of the imaging target 40, the processor 12 calculates a further first route and a further first imaging schedule. The further first route and the further first imaging schedule may be such that, were the aircraft 2 to follow the further first route and capture images in accordance with the further first imaging schedule, each point on the ground 8 within the imaging target 40 would be contained within at least one of the captured images (i.e. a further wide area search of the imaging target 40 would be performed). The images captured during the first imaging schedule may be registered with those captured during the further first imaging schedule. For example, the images captured during the first imaging schedule and the images captured during the further first imaging schedule may be transformed into a global coordinate system. An advantage provided by performing more than one wide area search of the imaging target 40 is that errors in determined geolocations of detected targets tend to be reduced. In particular, when determining a geolocation of a detected target from an image (e.g. as described in more detail later below), the uncertainty associated with that determined geolocation tends to be largest in the direction of travel of the aircraft 2 when that image was taken. Using more than one image to determine a geolocation of a detected target tends to advantageously decrease the associated uncertainty. Preferably, for each image used to determine a geolocation of a target, the direction that the aircraft 2 was travelling when that image was taken is different (for example, preferably perpendicular) to the direction that the aircraft 2 was travelling when each of the other images used to determine the geolocation of that target was taken. This may be provided by calculating the further first route in such a way that it is different to the first route 42. For example, the further first route may be determined using a criterion that an overlap between the further first and the first route is minimised.

Advantageously, uncertainty associated with a geolocation of a point or region tends to be greatly reduced if the direction in which the aircraft flies while that region is imaged during the first imaging schedule is substantially perpendicular to a direction in which the aircraft flies while that region is imaged during the further first imaging schedule. Thus, in embodiments in which a target is detected in the images captured during the first imaging schedule, the uncertainty associated with the geolocation of that target tends to be greatly reduced if the direction in which the aircraft flies while that target is imaged during the first imaging schedule is substantially perpendicular to a direction in which the aircraft flies while that target is imaged during the further first imaging schedule. Thus, the further first route may be determined using the position of the target determined from the images captured during the first imaging schedule, such that the further first route is perpendicular to the first route at the points on those routes at which the target is imaged.

What will now be described is a second embodiment of an imaging process performed at step s12.

In this second embodiment, the imaging target 40 is a predefined elongate terrain feature such as a road, a river, or a canal. For convenience, the imaging target 40 may be considered to be a linear terrain feature. In other embodiments, the imaging target is a different linear target such as a border of a country or man-defined feature. In other embodiments, the imaging target 40 is a line along the ground defined by a human such as an operator of the aircraft 2. In the second embodiment, the imaging of the imaging target 40 comprises performing a "feature following" process on the imaging target 40. The terminology "feature following" is used herein to refer to the imaging of an elongate imaging target 40 along its entire length. In this embodiment, a feature following process is a process comprising taking images of the imaging target 40, such that each point along the entire length of the elongate imaging target 40 is contained in at least one of those images. In this embodiment, a feature following process further comprises processing the captured images to detect targets of interest within those images.

In this embodiment, the imaging target 40 upon which the aircraft 2 is to perform the feature following process is a pre-specified feature, a specification of which is uploaded into the storage module 14 prior to the aircraft 2 taking off. However, in other embodiments, the imaging target 40 upon which the aircraft 2 is to perform the feature following process is a linear target that has been previously detected, for example, by performing the wide area search process (as described in more details above with reference to FIGS. 6 and 7).

Figure 8:
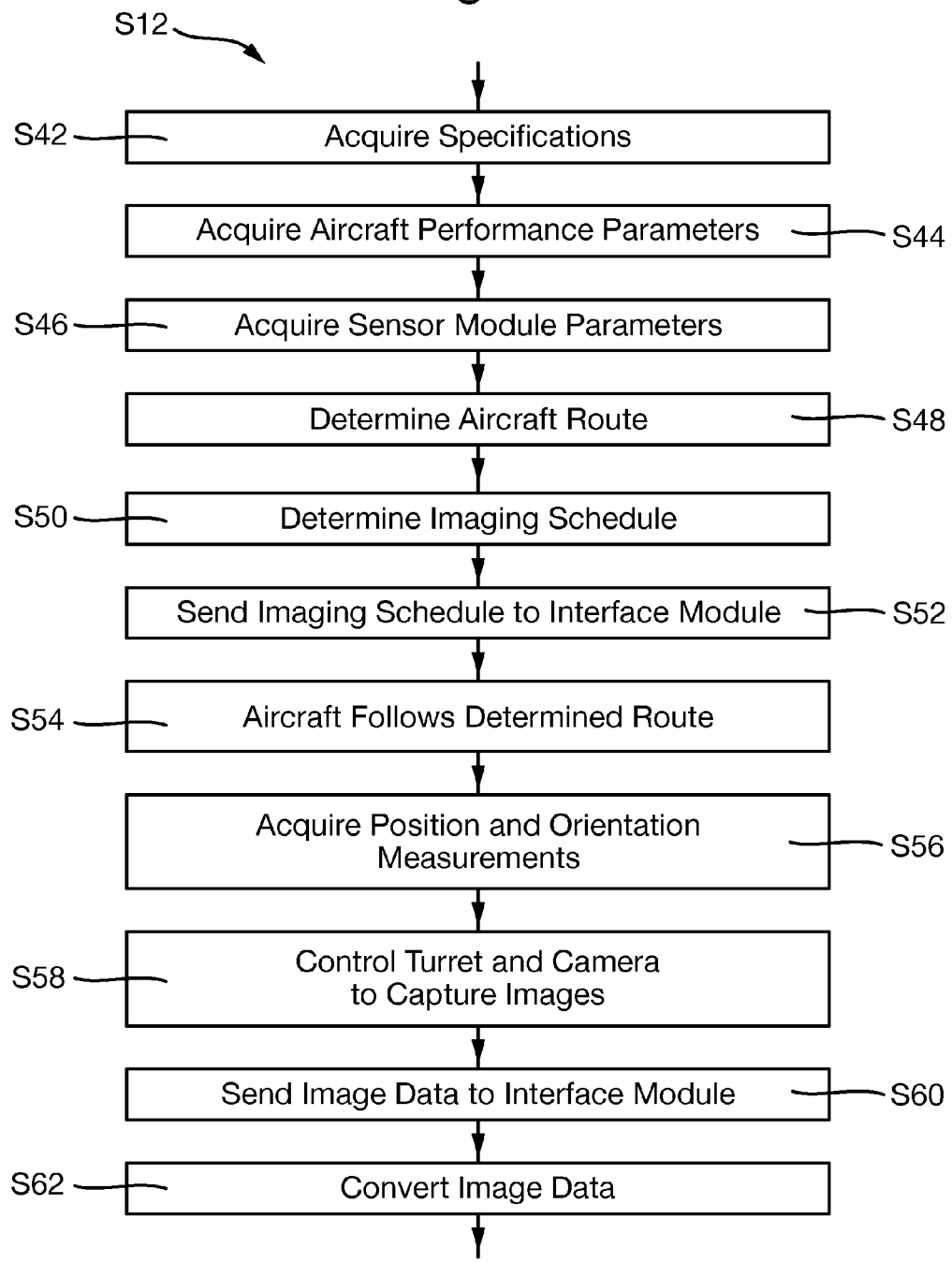
FIG. 8 is a process flow chart showing certain steps in a second embodiment of the imaging process.

FIG. 8 is a process flow chart showing certain steps in the second embodiment of the imaging process.

At step s42, the processor 12 acquires the specification for the imaging target 40 and the specification for the volume of airspace 38 that are stored in the storage module 14.

In this embodiment, the specification of the imaging target 40 includes global positions of points along the length of the linear imaging target 40.

At step s44, the processor 12 acquires current performance parameter values for the aircraft 2 from the aircraft subsystems 16. Examples of appropriate aircraft performance parameter values include, but are not limited to, velocities at which the aircraft 2 is capable of travelling, altitudes at which the aircraft 2 is capable of travelling, and a turning radius for the aircraft 2

At step s46, the processor 12 acquires performance parameter values for the sensor module 10 from the interface module 22. Examples of appropriate performance parameter values for the sensor module 10 include, but are not limited to, the frequency with which the camera 20 can capture images, a range of motion of the turret 28, and a maximum speed at which the turret 28 may move.

At step s48, using some or all of the information acquired at steps s42, s44, and s46, the processor 12 determines a route, hereinafter referred to as the "second route", within the volume of airspace 38 for the aircraft 2. The determined second route is such that, were the aircraft 2 to follow that route, the sensor module 10 would be capable of capturing images of the imaging target 40 such that each point along the length of the linear imaging target 40 is contained within at least one of those images. In this embodiment, the second route is such that, were the aircraft 2 to follow that route, the aircraft 2 would "follow" the imaging target 40 along its path.

Further information about the second route determined by the processor 12 at step s48 is described in more detail later below with reference to FIG. 9.

At step s50, the processor 12 determines an imaging schedule, hereinafter referred to as the "second imaging schedule", for the sensor module 10. In this embodiment, the second imaging schedule specifies a sequence of points along the second route and, for each of those points, a point along the linear imaging target 40 upon which the footprint of the camera 20 on the ground 8 is to be centred.

In this embodiment, the second imaging schedule is such that, were the camera 20 to capture images in accordance with that imaging schedule, each point along the linear the imaging target 40 would be contained within at least one of the captured images.

Each of the sequence of points along the second route may be specified, for example, by an aircraft position (e.g. as GPS coordinates and an altitude). Each of the points along the length of the linear imaging target 40 upon which the camera footprint is to be centred may be specified by GPS coordinates for that region.

Further information about the second imaging schedule is described in more detail later below with reference to FIG. 9.

At step s52, the processor 12 sends the second imaging schedule to the interface module 22 of the sensor module 10.

At step s54, the aircraft 2 is controlled (e.g. by the processor 12) so as to follow the second route.

At step s56, as the aircraft 2 follows the second route, the interface module 22 acquires position and orientation measurements from the position and orientation module 24. In particular, the interface module 22 acquires position measurements from the position sensor 30 and orientation measurements from the orientation sensor 32.

In this embodiment, the position and orientation module 24 is fixed to the support structure 26. Also, the turret 28 is fixed to the support structure 26. Thus, using the acquired position and orientation measurements, and using a known positional relationship between the turret 28 and the position and orientation module 24, and using the known orientation of the turret 28 relative to the support structure 26, the interface module 22 is able to determine a current position and orientation for the camera 20.

At step s58, using the determined current position and orientation of the camera 20 and using the second imaging schedule received from the processor 12, as the aircraft 2 follows the second route, the interface module 22 controls the turret 28 and the camera 20 so as to capture images in accordance with the second imaging schedule.

For example, a step in the second imaging schedule may specify a point along the linear imaging target 40 upon which the footprint of the camera 20 on the ground 8 is to be centred. Using the specification of that point, the interface module 22 determines a position an orientation for the camera 20 that would provide that the footprint of the camera 20 on the ground 8 is centred on that specified point. When that step in the second imaging schedule is reached, the interface module 22 controls the turret 28 so that the camera 20 has the determined position and orientation. Once the camera 20 has the desired position and orientation, the interface module 22 controls the camera 20 to capture an image of the imaging target 40. The captured image is centred on the specified point along the linear imaging target 40.

In this embodiment, an image of the imaging target 40 captured at the ith step of the second imaging schedule overlaps at least to some extent with an image of the imaging target 40 captured at the (i+1)th step of the second imaging schedule (if such an image is taken). Thus, each point along the length of the imaging feature 40 is contained in at least one image captured by the aircraft 2 during the feature following process.

Further information about the capturing of images performed at step s58 is described in more detail later below with reference to FIG. 9.

At step s60, the camera 20 sends the captured images to the interface module 22.

At step s62, the interface module 22 processes the received images so as to convert those images into the predetermined format that is usable by the processor 12.

After step s62, the method proceeds back to step s14 of FIG. 4, at which point the interface module 22 sends the converted images to the processor 12.

Thus, a second embodiment of the imaging process is provided.

Figure 9:
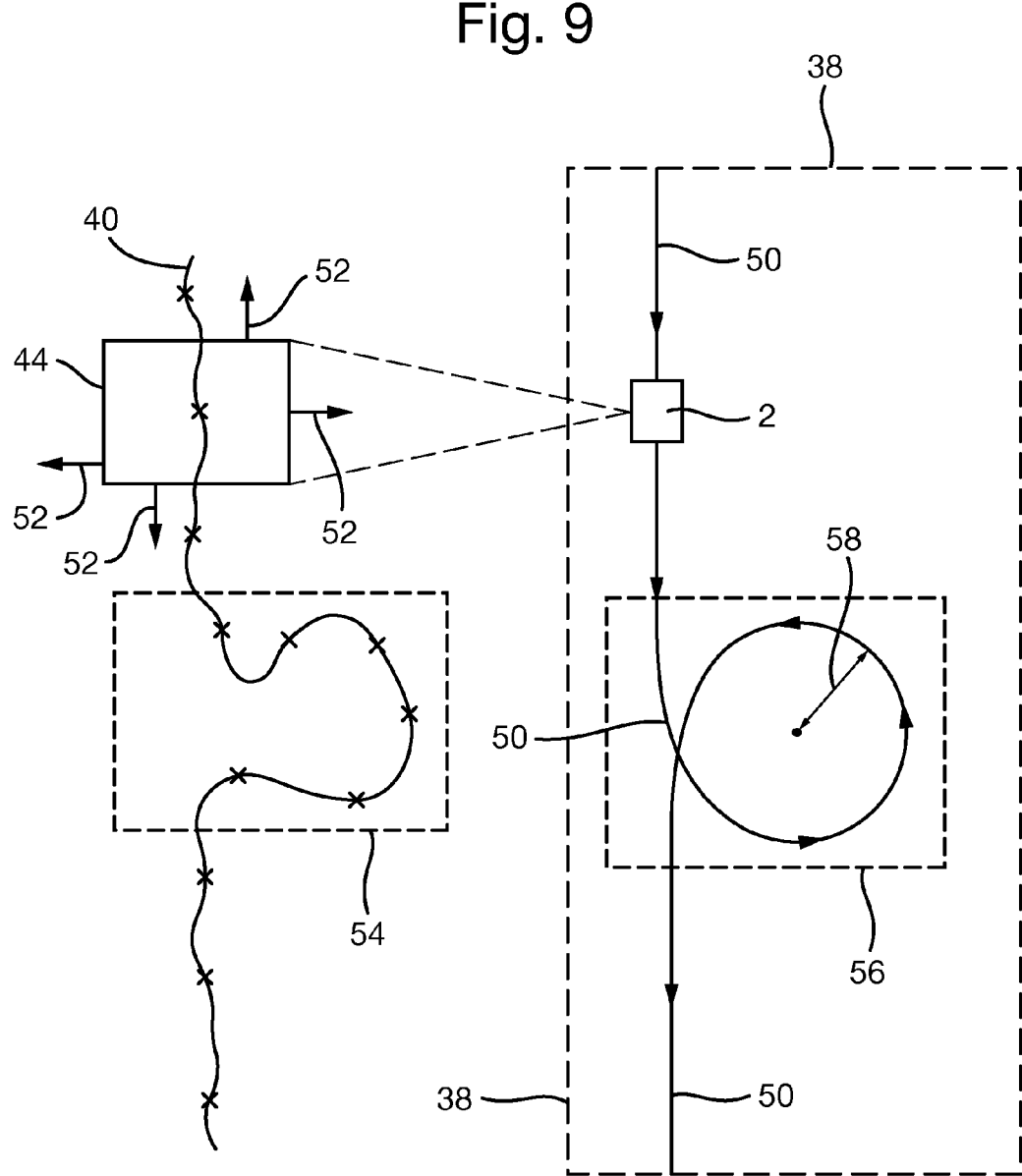
FIG. 9 is a schematic illustration (not to scale) showing the aircraft performing a feature following process.

FIG. 9 is a schematic illustration (not to scale) showing a top-down view of the aircraft 2 performing a feature following process to image the linear imaging target 40, as described above with reference to FIG. 8.

In this embodiment, the volume of airspace 38 in which the aircraft 2 is permitted to fly during the feature following process is defined with respect to the linear imaging feature 40. For example, in embodiments in which the linear imaging target 40 is a border of a country, the aircraft 2 may only be permitted to fly in the airspace above one side of that linear feature.

In FIG. 9, the second route is indicated by the reference numeral 50. The direction of travel of the aircraft 2 along the second route 50 is indicated in FIG. 9 by arrow heads placed along the second route 50.

As in FIG. 7, in FIG. 9, the camera footprint (i.e. the ground 8 that is able to be imaged by the camera 20 at a particular time-step) is indicated by the reference numeral 44.

In this embodiment, the size of the camera footprint 44 on the ground 8 at a particular time-step is dependent on the position and orientation of the camera 20 relative to the aircraft 2 (which may be controlled by controlling the turret 28), the position and orientation of the aircraft 2 (including the altitude of the aircraft 2 above the ground 8), and the surface relief of the ground 8 (information relating to which may, for example, be loaded onto the aircraft 2 prior to take-off). The size of the camera footprint 44 on the ground 8 at a particular time-step may be determined by the processor 12.

In this embodiment, the imaging target 40 is a linear feature. In this embodiment, when viewed from above, the shape of the second route 50 is substantially the same as that of the imaging target 40. In effect, the aircraft 2 "follows" the path of the linear imaging target 40.

In this embodiment, the second imaging schedule specifies a sequence of points (indicated by Xs in FIG. 9) along the linear imaging feature 40. The points X are points on the imaging target 40 upon which the camera footprint 44 is to be centred when images are captured. In this embodiment, the sequence of points X are determined by the interface module 22 dependent inter alia upon the size of the camera footprint 44 on the ground 8 such that, when the aircraft 2 follows the second route 50 and implements the second imaging schedule, each and every point along the entire length of the imaging target 40 is contained within at least one of the captured images.

In this embodiment, as the aircraft 2 follows the second route 50, the camera footprint 44 is moved along the length of the imaging target 40, and the turret 28 may be controlled, such that the camera footprint 44 is centred upon each of the points X in turn. When the camera footprint 44 is centred upon each point X, one or more images of the imaging target 40 are captured by the camera 20. In this embodiment, the turret 28 may be controlled such that the camera footprint 44 is moved in the direction of travel of the aircraft 2, and/or in a direction that is perpendicular to the direction of travel of the aircraft 2. Such movement of the camera footprint 44 is indicated in FIG. 9 by arrows and the reference numerals 52).

In this embodiment, the imaging target 40 comprises a curved portion along which multiple images are to be taken. This curved portion is indicated in FIG. 9 by a dotted box and the reference numeral 54. In this embodiment, the turning radius of the aircraft 2 is larger than the radius of curvature of the curved portion 54 of the imaging target 40. Thus, the second route 50 includes a loop, which is indicated in FIG. 9 by a dotted box and the reference numeral 56. In this embodiment, a route contains a "loop" if, when viewed from a certain direction, e.g. from above, the route crosses itself at at least one point. In this embodiment, the loop 56 increases the length of time that the aircraft spends in the vicinity of the curved portion 54, thereby allowing the aircraft 2 to image the curved portion in accordance with the second imaging schedule.

Preferably, the second route 50 is determined so as to minimise the number of loops 56. In this embodiment, the radius 58 of the loop 56 is dependent upon the minimum turn radius of the aircraft 2. In particular, the radius 58 is greater than or equal to the minimum turn radius of the aircraft 2.

In other embodiments, the second route 50 has a different shape to that described above. Also, in other embodiments, the turret 28 is controlled so as to move the camera footprint 44 in a different way to that described above, while still providing that each point along the length of the imaging target 40 is contained within at least one image captured by the camera 20 as the aircraft 2 follows the second route 50.

In some embodiments, after following the second route 50 and imaging the entirety of the imaging target 40, the processor 12 calculates a further second route and a further second imaging schedule. The further second route and the further second imaging schedule may be such that, were the aircraft 2 to follow the further second route and capture images in accordance with the further second imaging schedule, each point on the ground 8 along the length of the linear imaging target 40 would be contained within at least one of the captured images (i.e. a further feature following process would be performed to image the image target 40). An advantage provided by performing more than one feature following process on the imaging target 40 is that errors in determined geolocations of detected targets tend to be reduced. In particular, when determining a geolocation of a detected target from an image (which is described in more detail later below), the uncertainty associated with that determined geolocation tends to be largest in the direction of travel of the aircraft 2 when that image was taken. Using more than one image to determine a geolocation of a detected target tends to advantageously decrease the associated uncertainty. Preferably, for each image used to determine a geolocation of a target, the direction that the aircraft 2 was travelling when that image was taken is different to the direction that the aircraft 2 was travelling when each of the other images used to determine the geolocation of that target was taken.

What will now be described is a third embodiment of an imaging process performed at step s12.

In this third embodiment, the imaging target 40 is point on the ground 8 or a relatively small area of terrain. In the third embodiment, the imaging of the imaging target 40 comprises conducting "surveillance" of the imaging target 40. The terminology "surveillance" is used herein to refer to the reconnaissance of a target (e.g. a detected object) or a target area (i.e. a relatively small defined area of terrain). In this embodiment, surveillance is a process comprising taking images of the imaging target 40, such that the entirety of the imaging target 40 is contained in each of those images. In this embodiment, surveillance further comprises processing the captured images to detect targets of interest within those images.

In some embodiments, the imaging target 40 upon which a surveillance process is performed may be a target that has been previously detected, for example, by performing the wide area search process (as described in more details above with reference to FIGS. 6 and 7) or the feature following process (as described above with reference to FIGS. 8 and 9).

FIG. 10 is a process flow chart showing certain steps in the third embodiment of the imaging process.

At step s64, the processor 12 acquires the specification for the imaging target 40 and the specification for the volume of airspace 38 that are stored in the storage module 14.

At step s66, the processor 12 acquires current performance parameter values for the aircraft 2 from the aircraft subsystems 16. Examples of appropriate aircraft performance parameter values include, but are not limited to, velocities at which the aircraft 2 is capable of travelling, altitudes at which the aircraft 2 is capable of travelling, and a turning radius for the aircraft 2

At step s68, the processor 12 acquires performance parameter values for the sensor module 10 from the interface module 22. Examples of appropriate performance parameter values for the sensor module 10 include, but are not limited to, the frequency with which the camera 20 can capture images, a range of motion of the turret 28 (with respect to the aircraft fuselage), and a maximum speed at which the turret 28 may move.

In this embodiment, the aircraft 2 is required to perform surveillance of the imaging target 40 for a pre-specified amount of time. The processor 12 acquires a specification of this time period (e.g. which may have been loaded onto the aircraft 2 prior to take-off).

At step s70, using some or all of the information acquired at steps s64, s66, and s68, the processor 12 determines a route, hereinafter referred to as the third route, within the volume of airspace 38 for the aircraft 2. Preferably, the third route is such that, were the aircraft 2 to follow that route, at each time step within the time period, the sensor module 10 would be capable of capturing an image containing the entirety of the imaging target 40.

Further information about the third route is described in more detail later below with reference to FIG. 11.

At step s72, the processor 12 determines an imaging schedule, hereinafter referred to as the third imaging schedule, for the sensor module 10. In this embodiment, the third imaging schedule specifies the time-steps of the time period and the imaging target 40.

Each of the sequence of points along the third route may be specified, for example, by an aircraft position (e.g. as GPS coordinates and an altitude). The imaging target 40 of which the camera 20 is to capture an image at each time step of the time period may be specified by GPS coordinates for that target.

Further information about the third imaging schedule is described in more detail later below with reference to FIG. 11.

At step s74, the processor 12 sends the third imaging schedule to the interface module 22 of the sensor module 10.

At step s76, the aircraft 2 is controlled (e.g. by the processor 12) so as to follow the third route.

At step s78, as the aircraft 2 follows the third route, the interface module 22 acquires position and orientation measurements from the position and orientation module 24. In particular, the interface module 22 acquires position measurements from the position sensor 30 and orientation measurements from the orientation sensor 32.

In this embodiment, the position and orientation module 24 is fixed to the support structure 26. Also, the turret 28 is fixed to the support structure 26. Thus, using the acquired position and orientation measurements, and using a known positional relationship between the turret 28 and the position and orientation module 24, and using the known orientation of the turret 28 relative to the support structure 26, the interface module 22 is able to determine a current position and orientation for the camera 20.

At step s80, using the determined current position and orientation of the camera 20 and using the second imaging schedule received from the processor 12, as the aircraft 2 follows the second route, the interface module 22 controls the turret 28 and the camera 20 so as to capture images in accordance with the third imaging schedule (i.e., at each time-step within the time period, capture one or more images that wholly contain the imaging target 40).

For example, for a time step in the time period, using the current position and orientation of the camera 20, and using the specification of the imaging target 40, the interface module 22 determines a position an orientation for the camera 20 that would provide that the imaging target 40 would be wholly located in the camera's footprint on the ground 8. The interface module 22 then controls the turret 28 so that the camera 20 has the determined position and orientation. Once the camera 20 has the desired position and orientation, the interface module 22 controls the camera 20 to capture one or more images of the imaging target 40.

Further information about the capturing of images performed at step s80 is described in more detail later below with reference to FIG. 11.

At step s82, the camera 20 sends the captured images to the interface module 22.

At step s84, the interface module 22 processes the received images so as to convert those images into the predetermined format that is usable by the processor 12.

After step s84, the method proceeds back to step s14 of FIG. 4, at which point the interface module 22 sends the converted images to the processor 12.

Thus, a third embodiment of the imaging process is provided.

FIG. 11 is a schematic illustration (not to scale) of the aircraft 2 performing surveillance of the imaging target 40, as described above with reference to FIG. 10.

In FIG. 11, the third route is indicated by the reference numeral 58. The direction of travel of the aircraft 2 along the third route 58 is indicated in FIG. 11 by arrow heads placed along the third route 58.

As in FIGS. 7 and 9, in FIG. 11, the camera footprint (i.e. the ground 8 that is able to be imaged by the camera 20 at a particular time-step) is indicated by the reference numeral 44.

In this embodiment, the size of the camera footprint 44 on the ground 8 at a particular time-step is dependent on the position and orientation of the camera 20 relative to the aircraft 2 (which may be controlled by controlling the turret 28), the position and orientation of the aircraft 2 (including the altitude of the aircraft 2 above the ground 8), and the surface relief of the ground 8 (which may, for example, be loaded onto the aircraft 2 prior to take-off). The size of the camera footprint 44 on the ground 8 at a particular time-step may be determined by the processor 12.

In this embodiment, the third 58 route is such that, at each point along the third route 58, the sensor module 10 onboard the aircraft 2 is able to capture an image that wholly contains the imaging target 40. In this embodiment, the third route 58 is an "off-set loiter" whereby, at each point along the third route 58, the distance between the aircraft 2 and the imaging target 40 is greater than or equal to a predetermined minimum distance. This predetermined minimum distance may, for example, be uploaded onto the aircraft 2 prior to the aircraft 2 taking off, and stored in the storage module 14. An off-set loiter type route advantageously tends to reduce the likelihood of the aircraft 2 being detected by the entities at or proximate to the imaging target 40 compared to a type of route that permits the aircraft 2 to circle above the imaging target 40.

In this embodiment, the third route 58 is a loop, i.e. a start point of the third route 58 has the same position as an end point of the third route 58. Thus, the aircraft is able to "loiter" relative to the imagining target by following the loop.

Also, the third route 58 may be determined such that, for each point along the third route 58, the distance between the aircraft 2 and the imaging target 40 is less than or equal to a predetermined maximum distance. This predetermined maximum distance may, for example, be uploaded onto the aircraft 2 prior to the aircraft 2 taking off, and stored in the storage module 14. This predetermined maximum distance may be dependent upon the capabilities of the camera 20 such that, at each point along the third route 58, the camera 20 i capable of capturing images of the imaging target 40.

In this embodiment, the aircraft 2 comprises an exhaust from which, during flight, waste gases or air from an aircraft engine are expelled. The exhaust of the aircraft points in certain direction relative to the aircraft fuselage. The direction in which the exhaust of the aircraft 2 points is the direction in which waste gases from the engine are expelled. A specification of this direction may be acquired by the processor 12, for example, from an aircraft subsystem 16 (e.g. a propulsion system). In this embodiment, the determination of the third route 58 comprises minimising the duration for which the exhaust of the aircraft 2 is directed towards the imaging target 40. In other words, in this embodiment, the third route 58 is such that the length of time that the exhaust is directed towards the imaging target 40 during the third route 58 is minimised. The exhaust of the aircraft 2 tends to produce a high level of noise in the direction in which waste gases from the aircraft engine are expelled (compared to the level of noise in other direction). Also, the exhaust of the aircraft 2 tends to produce a high level of noise compared to other aircraft systems. In some situations, minimising the duration for which the exhaust is directed towards the imaging target 40 may minimise the level of aircraft noise experienced by entities at or proximate to the imaging target 40. This tends to reduce the likelihood of the aircraft 2 being detected, as a result of the noise generated by the aircraft 2, by the entities at or proximate to the imaging target 40.

In this embodiment, the aircraft subsystems 16 include one or more sensors for measuring a speed and direction of wind relative to the aircraft 2. Such measurements may be acquired by the processor 12. In this embodiment, the determination of the third route 58 comprises using measurements of the wind relative to the aircraft 2 so as to provide that, at each point along the third route 58, the aircraft 2 is downwind of the imaging target 40. In other embodiments, wind measurements may be used to determine a route such that, at each point along that route, the wind does not carry sound generated by the aircraft 2 (e.g. by the aircraft engine or exhaust) towards the imaging target 40. This tends to reduce the likelihood of the aircraft 2 being detected, as a result of the noise generated by the aircraft 2, by the entities at or proximate to the imaging target 40.

In some embodiments, the processor 12 uses wind measurements to determine the volume of airspace 38 in which the aircraft 2 is permitted to fly whilst following the third route 58. For example, the volume of airspace 38 may be determined as a volume that is wholly downwind of the imaging target 40.

In some embodiments, the processor 12 determines a position of the Sun relative to the aircraft 2. This may be performed using a clock measurement, a measurement of the location of the aircraft 2, and a measurement of the orientation of the aircraft 2, each of which may be acquired by the processor 12. In some embodiments, the determination of an aircraft route may comprise using the determined position of the Sun relative to the aircraft 2 to reduce glare in the images taken by the camera 20 and/or increase the likelihood of high quality images of the imaging target 40 being captured. In some embodiments, the determination of an aircraft route may comprise using the determined position of the Sun relative to the aircraft 2 to reduce the likelihood of the aircraft 2 being seen by a particular entity, for example, by positioning the aircraft 2 between the Sun and that entity.

What will now be described is an embodiment of the image processing method performed by the processor 12 at step s16.

FIG. 12 is a process flow chart showing certain steps of an embodiment of the image processing method.

At step s86, each image received by the processor 12 from the camera 20 is "geolocated". The terminology "geolocate" is used herein to refer to a process by which the real-world position of an image is determined.

In this embodiment, geolocation of an image comprises determining the real-world coordinates of each corner of the image, thereby determining the location of the portion of the ground 8 contained within that image. The coordinates of a corner of an image are determined by the processor 12 using the location and orientation of the aircraft 2 when that image was taken, and using the position and orientation of the camera 20 with respect to the aircraft 2 when that image was taken.

The processor 12 may also estimate, for each image, an uncertainty associated with the geolocation information for that image.

The processor 12 may also determine, for each image, a time at which that image was captured.

At step s88, each image and respective geolocation information (i.e. real-world coordinates of the image corners) is stored in the storage module 14.

At step s90, the processor 12 performs a target detection algorithm on the images of the imaging target 40 stored within the storage module 14. The algorithm is performed to detect targets of interest (e.g. vehicles, buildings, people, etc.) within the images.

Any appropriate target detection algorithm may be used. For example, an algorithm that detects image features dependent on the contrast of those features in the image, or an edge detection algorithm may be used.

At step s92, for each image, and for each target detected in that image, the processor 12 determines a geolocation for that target. A geolocation for a target within an image may be determined using the geolocation information relating to that image and stored in the storage module 14.

The processor 12 may also estimate, for each target, an uncertainty associated with the geolocation information for that target. The processor 12 may also determine, for each target, a time at which that the image of that target was captured.

At step s94, for each image, a list of the targets detected within that image and the corresponding geolocation information for the targets is compiled.

At step s96, the lists of the target (including the geolocation information for the detected targets) are stored in the storage module 14.

At step s98, image property information (including the geolocation information of each of the images and, in some embodiments, information about the errors/uncertainty associated with that geolocation information and/or times at which each of the images were taken) is transmitted from the aircraft 2 to the ground station 4, by the transceiver 18, via the wireless communications link 6.

At step s100, target property information (including the geolocation information for each of the detected targets and, in some embodiments, information about the errors/uncertainty associated with that geolocation information and/or times at which images of each of the targets were taken) is transmitted from the aircraft 2 to the ground station 4, by the transceiver 18, via the wireless communications link 6.

In this embodiment, only information relating to certain properties of the images/targets is transmitted to the base station from the aircraft 2, not the images themselves. Thus, the amount of data transmitted to the ground station 4 at steps s98 and s100 tends to be small relative to the amount of data that would be transmitted were the images themselves transmitted.

In this embodiment, as more images of the imaging target 40 are captured by the camera 20 and processed by the processor 12, targets detected in different images are associated together (i.e. assumed to be the same) if the geolocations of those targets are the same or within a pre-defined distance of one another. A geolocation of a target may be determined using the geolocations of that target in each of the different images in which that target is detected. For example, the geolocation of a target may be determined as the average (or centre of mass) of the geolocations of that target determined from each of the different images in which that target was detected. This process of associating together targets with the same or sufficiently similar geolocation information advantageously tends to reduce the uncertainly about a detected target's true geolocation.

Thus, in this embodiment, geolocation information for detected targets is continuously updated during the imaging of the imaging target 40. Updated information may be continuously sent from the aircraft 2 to the ground station 4.

In some embodiments, as more images of the imaging target 40 are captured by the camera 20, those images may be registered together.

At step s102, the information sent to the ground station 4 at steps s98 and s100 is displayed to an operator at the ground station 4 (e.g. target locations may be displayed on a map on a display screen). Time and date information for an image (specifying when an image was taken) may also be displayed to the operator.

At step s104, the operator selects a particular target of interest (e.g. by selecting that target on the display screen). In this embodiment, this generates a request for an image of the selected target to be returned to the ground station 4.

The operator may request that a certain type of image is returned to the ground station 4. For example, the operator may request a cropped image (i.e. a sub-image) containing a certain target, or a compressed version of an entire camera image containing that target.

At step s106, the ground station 4 sends the generated request to the transceiver 18 of the aircraft 2. The transceiver 18 relays the request to the processor 12.

At step s108, the processor 12 processes the received request and retrieves, from the storage module 14, one or more images containing the target specified in the request (i.e. the particular target that was selected by the operator at step s104).

At step s110, the processor 12 processes the retrieved image such that an image corresponding to the operator's request is produced.

At step s112, the transceiver 18 transmits the produced image to the ground station 4 via the wireless communications link 6.

At step s114, the image received at the ground station 4 is displayed to the operator for analysis.

Thus, the image processing method performed at step s16 of the trajectory planning algorithm is provided.

In this embodiment, after a target has been detected by performing the imaging process described above with reference to FIGS. 4 to 12, a payload delivery process is performed so as to deliver the payload 19 to a detected target. In other embodiments, a different process (e.g. a different payload delivery process) is performed after a target has been detected.

FIG. 13 is a process flow chart showing certain steps of an embodiment of a payload delivery process.

At step s116, the operator located at the ground station 4 identifies a target to which the payload 19 is to be delivered. The target to which the payload 19 is to be delivered is hereinafter referred to as the "payload target". For example, at step s114 of the above described imaging process, the operator analyses the displayed images and selects a target within the displayed images as being the payload target.

At step s118, the ground station 4 sends a geolocation of the payload target to the transceiver 18 of the aircraft 2. The transceiver 18 relays this target specification to the processor 12. In other embodiments, a target identifier may be sent to the aircraft 2 and the processor 12 may determine/acquire a geolocation for that specified target using information stored in the storage module 14.

At step s120, the processor 12 acquires current aircraft parameter values for the aircraft 2 from the aircraft subsystems 16. Examples of appropriate aircraft parameter values include, but are not limited to, velocities at which the aircraft 2 is capable of travelling, altitudes at which the aircraft 2 is capable of travelling, and a turning radius for the aircraft 2. In this embodiment, the aircraft subsystems 16 include one or more sensors for measuring a speed and direction of wind relative to the aircraft 2. Such measurements are also acquired by the processor 12.

At step s122, the processor 12 acquires values of one or more parameters relating to the payload 19. In this embodiment, the processor 12 acquires values for the mass of the payload 19 and a drag coefficient for the payload 19 in air (or other value indicative of the drag that would be experienced by the payload 19 were the payload 19 to be released from the aircraft 2). In this embodiment, the processor further acquires other properties of the payload 19 such as the type of payload 19, whether or not the payload 19 is a dumb payload, a steered payload, a guided payload, or another type of payload, and whether or not the payload 19 includes a parachute. The processor 12 may also acquire, e.g. from the storage module 14 or from the payload 19, a specification of a distance from the payload target within which the payload 19 is to land on the ground 8.

At step s124, using some or all of the information acquired by the processor 12 at steps s118-s122, the processor 12 determines a location and a velocity, which are hereinafter referred to as the "payload release location" and "payload release velocity" respectively. The payload release location may be specified by a geolocation and an altitude. The payload release velocity may be specified by an aircraft heading and an aircraft speed. In this embodiment, the payload release location and payload release velocity are such that, were the aircraft 2 to release the payload 19 whilst located at the payload release location and travelling with the payload release velocity, the payload 19 would land on the ground 8 within the pre-specified distance of the payload target.

In some embodiments, for example in embodiments in which the payload is a steered or guided payload, the payload release location is a volume of airspace in which the payload may be released (and subsequently steered or guided, e.g. by the processor 12, towards the payload target). In such embodiments, the payload release velocity may be a range of velocities.

At step s126, using the determined payload release location and using measurements of the aircraft's current position and orientation, the processor 12 determines a route from the aircraft's current location to the payload release location. This determined route will hereinafter be referred to as the fourth route.

At step s128, using the determined fourth route, the payload release velocity and using a measurement of the aircraft's current velocity, the processor 12 determines a velocity profile for the aircraft 2 along the along the fourth route. In this embodiment, the velocity profile is such that, were the aircraft 2 to travel along the fourth route with the determined velocity profile, the aircraft 2 would arrive at the payload release location travelling at the payload release velocity.

At step s130, the aircraft 2 is controlled (e.g. by the processor 12) so as to follow the fourth route in accordance with the determined velocity profile.

At step s132, when the aircraft 2 reaches the payload release location, the processor 12 releases the payload 19 from the aircraft 2. At the payload release location the aircraft is travelling at the payload release velocity.

At step s134, after being release from the aircraft 2, the payload 19 travels towards the payload target, and land on the ground 8 within the pre-specified distance of the payload target. Thus, the payload 19 is delivered to the payload target.

Thus, a payload delivery process is provided.

An advantage provided by the above described system and method is that a route that is to be followed by the aircraft is determined on-board the aircraft. Also, the aircraft may be controlled so as to follow the determined route by systems located on-board the aircraft. Thus, the aircraft tends to be capable of acting autonomously, i.e. without receiving instructions or control signals from the ground station.

A further advantage provided by the above described system and methods is that task information, including task parameters, can be uploaded to the aircraft whilst the aircraft is on the ground (i.e. prior to take off), or whilst the aircraft is airborne, thereby allowing for the updating of task parameters after take-off. Furthermore, certain of the task parameters can advantageously be measured/determined using other systems on-board the aircraft. For example, an aircrafts Global Positioning System (GPS), or the aircraft's avionic or fuel systems etc. can be used to determine parameters such as the location and orientation of the aircraft, the time of day, and/or how much fuel/time is left to complete a task.

An advantage provided by the above described sensor module is that measurements taken by the position and orientation module may be used to accurately determine a position and orientation of the camera. This tends to be due to the position and orientation module and the turret to which the camera is mounted having a fixed position and orientation with respect to one another as a result of being attached to the rigid structure. The determined position and orientation of the camera tend to be more accurate than those that may be produced using conventional systems, for example, those systems in which position and orientation measurements of an aircraft are used to determine a position and orientation of a camera mounted to that aircraft. Accurate position and orientation measurements of the camera tend to facilitate in the accurate control of the camera. Furthermore, geolocations of the images produced by the camera, and geolocations for targets detected in those images, tend to be more accurate than those produced using conventional imaging systems.

A further advantage provided by the above described sensor module is that the sensor module is modular. The interface module, in effect, isolates the processor from the detailed implementation of the camera and the position and orientation module. The processor sends imaging commands to the interface module and, in response, receives image data in a predetermined format. The control of the camera and turret is entirely performed by the interface module.

In the above embodiments, the communications link between the processor and the interface module is standardised.

In some embodiments, an operator may replace a sensor module that includes one type of imaging sensor with a sensor module that includes a different type of imaging sensor. In other words, a sensor module that includes one type of imaging sensor may be removed from the aircraft and a sensor module that includes a different type of imaging sensor may be installed in its place. As the communications link between the processor and the interface module is standardised across all such sensor modules, updates to other aircraft systems (such as the processor) tend not to be required. Sometime after being installed on an aircraft, the interface module of a sensor module may send certain sensor module parameters (such as sensor types, range of motion etc.) to the processor.

In the above embodiments, the sensor module includes the turret. However, in other embodiments, the sensor module does not include that turret. Thus, when replacing a first sensor module with a second sensor module, the first sensor module may be removed from the turret and the second sensor module may be attached to the turret in its place.

Advantageously, using the above described system and methods, the aircraft tends to be capable of performing a wide area search of a given area of terrain. The wide area search of the given area of terrain may be performed autonomously by the aircraft. The wide area search of the given area of terrain advantageously tends to facilitate the detection of targets within that area of terrain. Furthermore, advantageously, the wide area search may be performed such that a number of criteria are satisfied (e.g. such that the number of turns performed by the aircraft while performing the wide area search is minimised).

Advantageously, using the above described system and methods, the aircraft is able to follow (for example, fly above) an elongate portion of terrain, and capture images along the entire length of that elongate portion of terrain. The feature following process may be performed autonomously by the aircraft. The feature following process advantageously tends to facilitate the detection of targets along the length of the elongate region of terrain. Furthermore, advantageously, the aircraft may follow the elongate portion of terrain even if the elongate portion of terrain includes bends or curves that have a radius of curvature that is smaller than the turning radius of the aircraft. This tends to be provided by including one or more loops in the aircraft's route.

Advantageously, using the above described system and methods, the aircraft tends to be capable of performing surveillance of a target on the ground. The surveillance may be performed autonomously by the aircraft. The surveillance of a target advantageously tends to facilitate the detection of other targets at or proximate to target under surveillance. For example, if the target under surveillance is a building, the above described surveillance process may be performed to detect (and subsequently identify) people of vehicles entering or leaving that building. In some embodiments, the surveillance of a target may be performed to detect actions performed by that target. For example, if the target under surveillance is a vehicle, the above described surveillance process may be performed to detect when that vehicle moves, and where that vehicle moves to.

Advantageously, the surveillance process may be performed such that a noise signature of the aircraft experienced at or proximate to the target under surveillance tends to be minimised. This advantageously tends reduce the likelihood of the aircraft being detected by entities located at or proximate to the target under surveillance.

An advantage provided by performing the above described image processing method is that, unless otherwise instructed, the aircraft only transmits image properties (i.e. image geolocation and the associated uncertainty etc.), and the properties of any detected targets. In other words, unless such data is requested, complete image data is not transmitted from the aircraft to the ground station. The image/target property data tends to be a much smaller amount than complete image data. Thus, bandwidth requirements of communications between the aircraft and the ground station tend to be reduced.

Furthermore, only the image data of particular interest to an operator at the ground station (i.e. only cropped sub-images or compressed images that are requested by the operator) are transmitted to the ground station for analysis. This further tends to provide that bandwidth requirements of communications between the aircraft and the ground station are reduced. Moreover, since relatively useless and/or redundant information is not transmitted to the operator for analysis, the analysis by the operator tends to be easier and/or more efficient.

A further advantage provided by the above described image processing method is that image information and information about any detected targets (e.g. geolocation etc.) tends to be continuously updated as more images are taken by the aircraft. This advantageously tends to reduce uncertainty in the information provided to the ground station. Thus, more accurate results tend to be produced compared to conventional image processing techniques.

Advantageously, the above described payload delivery process may be used to deliver a payload to a target. The aircraft tends to be capable of delivering the payload to its intended target autonomously. Environmental conditions, such as wind speed and direction, and also the presence of terrain features (such as lakes, rivers, mountains, etc.) may advantageously be taken into account during the payload delivery process. Advantageously, the processor tends to be capable of determining an optimum aircraft position and velocity for payload release.

Apparatus, including the processor and/or the interface module, for implementing the above arrangement, and performing the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in any of the flowcharts and described herein may be omitted or such process steps may be performed in differing order to that presented herein and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the imaging process is implemented by an unmanned air vehicle. However, in other embodiments a different type of vehicle is used. For example, in other embodiments, an unmanned land-based vehicle, or a semi-autonomous or manned aircraft is used.

In the above embodiments, a single vehicle images a single imaging target. However, in other embodiments a plurality of vehicles is used. Also, in other embodiments, there is a plurality of different imaging targets.

In the above embodiments, the camera is a visible band camera. However, in other embodiments, a different type of sensor is used. For example, an infrared camera, an ultraviolet camera, a range sensor, or an ultrasound sensor may be used. In some embodiments, the sensor module includes more than one type of sensor.

In the above embodiments, the flight path that the aircraft follows from the ground station to the volume of airspace is defined by a sequence of waypoints. However, in other embodiments the flight path may be defined in a different way, for example, using a sequence of aircraft headings and corresponding flight durations. In other embodiments, the aircraft may be controlled by a human operator until the aircraft arrives at a point in the volume of airspace.

In the above embodiments, the processor determines the route that the aircraft is to follow to perform an imaging process in response to the aircraft entering the volume of airspace. However, in other embodiments, the processor determines the route when a different set of criteria have been satisfied. For example, in other embodiments the route for the imaging process is determined by the processor when the aircraft is at a specific location, within a pre-determined distance of a specific location, or at a certain time of day.

In the above embodiments, a volume of airspace is defined in which the aircraft is permitted to fly whilst performing the imaging process. However, in other embodiments no such volume is defined. For example, in other embodiments the aircraft is allowed to fly anywhere during the imaging process. In some embodiments, a minimum distance that the aircraft must be from the imaging target while performing the imaging process is implemented. In some embodiments, a maximum distance that the aircraft may be from the imaging target while performing the imaging process is implemented.

A route that the aircraft is to follow to perform an imaging process may be any shape. Furthermore, a route may depend on any appropriate criteria or measurements instead of or in addition to those mentioned above. For example, a requirement that the aircraft remains substantially at certain compass bearing from the area of terrain may be implemented.

In the above embodiments, the aircraft performs a single imaging process. However, in other embodiments a different number of imaging processes are performed. One or more of the performed imaging processes may be different to one or more of the other imaging processes that are performed. For example, in some embodiments, one or more wide area searches and/or one or more feature following processes may be performed to detect a target within a certain region. One or more surveillance operations may then be performed on the detected target.

In the above embodiments, during the information processing process, data is transmitted to the ground station from the aircraft for analysis by an operator. However, in other embodiments, data is transmitted from the aircraft to a different entity, for example, an entity that is remote from the aircraft such as a different aircraft. In some embodiments, data is transmitted from the processor for use by other systems on-board the aircraft. In some embodiments transmitted data is for another purpose instead of or in addition to analysis by an operator (e.g. for use as an input to a further process).

In the above embodiments, a payload delivery process is performed to deliver a single payload to a single target. However, in other embodiments, the payload delivery process may be performed to deliver a different number of payloads to a different number of targets. In some embodiments, there may be a plurality of different types of payloads.

In the above embodiments, captured images are processed using the image processing method described above with reference to FIG. 12. However, in other embodiments images may be processed in a different way. For example, in other embodiments an image processing method in which all full image data (i.e. all data gathered by the aircraft) is transmitted to the ground station is used. Also, in other embodiments, an image processing method in which no data is transmitted whilst the aircraft is airborne is used. For example, all image data may be stored on-board the aircraft and be downloaded when the aircraft lands.

The invention claimed is:

1. An imaging method for capturing images using a sensor mounted on an unmanned aircraft, the method comprising:
    acquiring, by one or more processors, a specification of possible positions and orientations relative to the aircraft to which the sensor may be moved;
    acquiring, by the one or more processors, a specification of the manoeuvrability of the aircraft;
    acquiring, by the one or more processors, a specification of a linear path along the ground;
    using the specification of the manoeuvrability of the aircraft and the specification of the path, determining, by the one or more processors, that the path includes a portion having a radius of curvature that is smaller than a minimum turning radius of the aircraft;
    using the specification of the possible positions and orientations of the sensor relative to the aircraft, the specification of the path, and the specification of the manoeuvrability of the aircraft, determining, by the one or more processors, a route for the aircraft to follow and an imaging schedule for the sensor, wherein determining the route comprises, responsive to determining that the path includes a portion having a radius of curvature that is smaller than a minimum turning radius of the aircraft, including, in the route, a loop;

following, by the aircraft, the route; and whilst the aircraft follows the route, performing, by the sensor, the imaging schedule including the sensor moving with respect to the aircraft such that, for each point along the path, that point is coincident with a footprint of the sensor on the ground for at least some time during the procedure, and the sensor capturing images such that each point along the path is present within at least one of the captured images; wherein the portion of the path that has a radius of curvature that is smaller than a minimum turning radius of the aircraft is imaged as the aircraft flies along the loop.

2. The method according to claim 1, wherein the one or more processors are located on-board the aircraft.

3. The method according to claim 1, wherein the method further comprises acquiring, by the one or more processors, a specification of a volume of airspace;

the step of determining the route and imaging schedule comprises using the specification of the volume of airspace; and the route is wholly within the volume of airspace.

4. The method according to claim 1, wherein:

the one or more processors are located on-board the aircraft; and the method further comprises:

for each image in the set, determining, by the one or more processors, a set of properties of that image;

performing, by the one or more processors, a target detection process on the set of images to detect one or more first targets within the set of images;

for each detected first target, determining, by the one or more processors, a set of properties of that first target;

transmitting, by a transmitter on-board the aircraft, for use by an entity remote from the aircraft, the determined image properties;

transmitting, by the transmitter, for use by the entity, the determined first target properties;

by the entity, using the received image properties and first target properties, identifying a region of interest on the ground;

sending, from the entity to the aircraft, a request for image data relating to the region of interest;

receiving, by a receiver on-board the aircraft, the request; and in response to receiving the request, transmitting, by the transmitter, for use by the entity, the image data relating to the determined region of interest.

5. The method according to claim 1 further comprising:

processing the captured images to detect, within at least one image, a second target;

acquiring, by the one or more processors, a position on the ground of the detected second target;

using the acquired specification of the possible positions and orientations of the sensor relative to the aircraft, the acquired position of the second target, and the specification of the manoeuvrability of the aircraft, determining, by the one or more processors, a procedure to be performed by the aircraft;

performing, by the aircraft, the procedure; and whilst the aircraft performs the procedure, capturing, by the sensor, a further set of images; wherein the procedure comprises the aircraft moving with respect to the second target and the sensor moving with respect to the aircraft such that the second target is coincident with a footprint of the sensor on the ground for the entire duration of the procedure; and capturing the further set of images is performed such that the whole of the second target is present within each image in the further set.

6. The method according to claim 1 further comprising:

processing the captured images to detect, within at least one image, a third target;

acquiring, by the one or more processors, a position on the ground of the detected third target;

acquiring, by the one or more processors, a specification of a direction relative to the aircraft in which an exhaust of the aircraft points;

using the acquired position of the third target, the specification of the manoeuvrability of the aircraft, and the acquired specification of the direction, determining by the one or more processors, a further route for the aircraft; and following, by the aircraft, the further route; wherein the determination of the further route comprises minimising a duration for which the exhaust of the aircraft is directed towards the third target.

7. The method according to claim 1, wherein the aircraft comprises a payload releasably attached to an aircraft; and the method further comprises:

processing the captured images to detect, within at least one image, a fourth target;

acquiring, by the one or more processors, a position on the ground of the detected fourth target;

acquiring, by the one or more processors, parameter values relating to properties of the payload;

acquiring, by the one or more processors, parameter values relating to environmental conditions in which the aircraft is flying;

using the acquired position of the fourth target, the acquired parameter values relating to properties of the payload, and the acquired parameter values relating to environmental conditions, determining, by the one or more processors, a position and a velocity for the aircraft;

using the determined position and velocity for the aircraft, determining, by the one or more processors, a further procedure for the aircraft;

performing, by the aircraft, the further procedure; and at a point in the further procedure that the aircraft has the determined position and velocity, releasing, by the aircraft, the payload;

the determined position and a velocity for the aircraft are such that, were the aircraft to release the payload whilst located at the determined position and travelling at the determined velocity, the payload would land on the ground within a predetermined distance of the fourth target; and the further procedure is such that, were the aircraft to perform the further procedure, at at least one instance during the further procedure, the aircraft would be located at the determined position and travelling at the determined velocity.

8. The method according to claim 1, the step of capturing the set of images comprises, for each image:

acquiring, by one or more processors, a specification of a region on the ground to be imaged;

measuring, by a position sensor fixedly mounted to a rigid support structure, a position of the position sensor;

measuring, by an orientation sensor fixedly mounted to the rigid support structure, an orientation of the orientation sensor;

using the measured position and orientation and using the acquired region specification, determining, a position and orientation for the sensor, the sensor being fixedly mounted to the rigid support structure; and controlling the aircraft and the orientation of the sensor on-board the aircraft such that the sensor has the determined position and orientation, thereby providing that a footprint of the sensor on the ground is coincident with the region on the ground to be imaged; and when the sensor has the determined position and orientation, capturing, by the sensor, one or more images of the area of the ground within the sensor footprint; wherein the rigid support structure is releasably coupled to the airframe of the aircraft.

9. The method according to claim 1, wherein the path along the ground follows the path of a terrain feature or a border of a country.

10. The method according to claim 1, wherein the aircraft is an autonomous unmanned aircraft.

11. An apparatus for capturing images, the apparatus comprising:

a sensor mounted on-board an unmanned aircraft;

one or more processors configured to:

acquire a specification of possible positions and orientations relative to the aircraft to which the sensor may be moved;

acquire parameter values relating to the manoeuvrability of the aircraft;

acquire a specification of a linear path along the ground;

using the specification of the manoeuvrability of the aircraft and the specification of the path, determine that the path includes a portion having a radius of curvature that is smaller than a minimum turning radius of the aircraft;

using the acquired specification of the possible positions and orientations of the sensor relative to the aircraft, the acquired specification of the path, and the specification of the manoeuvrability of the aircraft, determine a route for the aircraft to follow and an imaging schedule for the sensor, wherein determining the route comprises, responsive to determining that the path includes a portion having a radius of curvature that is smaller than a minimum turning radius of the aircraft, including in the route including a loop; and a controller controlling the aircraft to follow the route;

wherein the sensor is configured to, whilst the aircraft follows the route, perform the imaging schedule including the sensor moving with respect to the aircraft such that, for each point along the path, that point is coincident with a footprint of the sensor on the ground for at least some time during the procedure, and the sensor capturing images such that each point along the path is present within at least one of the captured images, wherein the portion of the path that has a radius of curvature that is smaller than a minimum turning radius of the aircraft is imaged as the aircraft flies along the loop.

12. An aircraft comprising the apparatus according to claim 11.

13. The aircraft according to claim 12, wherein the aircraft is an unmanned aircraft.

14. A non-transitory computer-readable tangible media having instructions stored thereon that when executed on one or more processors cause the processor to operate in accordance with the method of claim 1.

* * * * *

UNITED STATES PATENT AND TRADEMARK OFFICE
CERTIFICATE OF CORRECTION

PATENT NO. : 10,051,178 B2
APPLICATION NO. : 15/100469
DATED : August 14, 2018
INVENTOR(S) : Andrew Christopher Tebay It is certified that error appears in the above-identified patent and that said Letters Patent is hereby corrected as shown below:

On the Title Page

Item (54) The title should be: IMAGING METHOD AND APPARATUS

In the Specification

Column 1, Line 1, should be: IMAGING METHOD AND APPARATUS

Signed and Sealed this
Eighteenth Day of October, 2022

*Katherine Kelly Vidal*

Katherine Kelly Vidal
*Director of the United States Patent and Trademark Office*